(12) United States Patent
Zhang et al.

(10) Patent No.: US 9,348,906 B2
(45) Date of Patent: May 24, 2016

(54) METHOD AND SYSTEM FOR PERFORMING AN AUDIO INFORMATION COLLECTION AND QUERY

(71) Applicant: Tencent Technology (Shenzhen) Company Limited, Shenzhen (CN)

(72) Inventors: Xiaolong Zhang, Shenzhen (CN); Bin Zhang, Shenzhen (CN); Deyuan Li, Shenzhen (CN); Hailong Liu, Shenzhen (CN); Jie Hou, Shenzhen (CN); Dadong Xie, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 154 days.

(21) Appl. No.: 14/315,250

(22) Filed: Jun. 25, 2014

(65) Prior Publication Data

US 2014/0310269 A1    Oct. 16, 2014

Related U.S. Application Data

(63) Continuation of application No. PCT/CN2013/087827, filed on Nov. 26, 2013.

(30) Foreign Application Priority Data

Feb. 4, 2013  (CN) .......................... 2013 1 0042406

(51) Int. Cl.
*G06F 17/30*       (2006.01)
*G06F 7/00*        (2006.01)

(52) U.S. Cl.
CPC .... *G06F 17/30749* (2013.01); *G06F 17/30769* (2013.01)

(58) Field of Classification Search
USPC ......................................................... 707/725
See application file for complete search history.

(56) References Cited

U.S. PATENT DOCUMENTS

| | | | |
|---|---|---|---|
| 2003/0167174 A1* | 9/2003 | Dagtas | G11B 20/10527 704/275 |
| 2006/0074649 A1* | 4/2006 | Pachet | G10H 1/0066 704/229 |

(Continued)

FOREIGN PATENT DOCUMENTS

| | | |
|---|---|---|
| CN | 1592906 A | 3/2005 |
| CN | 101271457 A | 9/2008 |
| CN | 101896904 A | 11/2010 |
| WO | WO 0162004 A2 | 8/2001 |

OTHER PUBLICATIONS

Tencent Technology, ISRWO, PCT/CN13/87827 Mar. 6, 2014, 7 pgs.

(Continued)

*Primary Examiner* — Kuen Lu
(74) *Attorney, Agent, or Firm* — Morgan, Lewis & Bockius LLP

(57) ABSTRACT

An electronic device with one or more processors, memory, and a display detects a first trigger event and, in response to detecting the first trigger event, collects a audio sample of environmental audio data associated with a media item. The device transmits information corresponding to the audio sample to a server. In response to transmitting the information, the device obtains attribute information corresponding to the audio sample, where the attribute information includes metadata for the media item, a time indicator of a position of the audio sample in the media item, and stream information for the media item. The device displays a portion of the attribute information. The device detects a second trigger event and, in response to detecting the second trigger event: determines a last obtained time indicator; streams the media item based on the stream information; and presents the media item from the last obtained time indicator.

19 Claims, 16 Drawing Sheets

(56) References Cited

U.S. PATENT DOCUMENTS

| | | |
|---|---|---|
| 2007/0124775 A1 | 5/2007 | DaCosta |
| 2010/0142725 A1* | 6/2010 | Goldstein ............... G10L 19/00 381/92 |
| 2014/0133663 A1* | 5/2014 | Grokop ............. H04M 1/72569 381/56 |

OTHER PUBLICATIONS

Zhang et al., An Online Music Indexing System Based on Human Tone, Institute of Artificial Intelligence and Roboties, Xi'an Jiatong University, Xi'an 710049 China, May 2006, 6 pgs.

* cited by examiner

METHOD AND SYSTEM FOR PERFORMING AN AUDIO INFORMATION COLLECTION AND QUERY

RELATED APPLICATIONS

This application is a continuation application of PCT Patent Application No. PCT/CN2013/087827, entitled "METHOD AND SYSTEM FOR PERFORMING AN AUDIO INFORMATION COLLECTION AND QUERY" filed on Nov. 26, 2013, which claims priority to Chinese Patent Application No. 201310042406.1, "METHOD AND SYSTEM FOR PERFORMING AN AUDIO INFORMATION COLLECTION AND QUERY," filed on Feb. 4, 2013, both of which are hereby incorporated by reference in their entirety.

TECHNICAL FIELD

The present application relates to the technical field of audio analysis and, more particularly, to a method and device for performing an audio information query.

BACKGROUND

With the development of the Internet as an indispensable tool for obtaining information, using Internet enabled devices to perform an audio information query is becoming a new application trend. The conventional audio information query method typically includes the following steps: first, a user manually inputs basic information of unknown audio (e.g., lyrics, name, or singer of unknown audio, and the like); and second, based on this basic information, the Internet enabled device searches for the complete information of the unknown audio (e.g., via a local or Internet query). It is necessary to manually input the basic information for the aforementioned method; hence, the audio information query is inefficient. Additionally, under most circumstances, the user may not know the basic information of the unknown audio, or the basic information input by the user is incorrect, so the audio information query cannot be realized effectively. For example, the user hears a small piece of music in the surrounding environment, but does not know other information of the music, so an effective audio information query cannot be performed, which reduces the intelligent functions of the Internet device.

SUMMARY

In order to solve the problems in the prior art, the embodiments of the present application provide a method and device for performing an audio information query. The method is performed at an electronic device (e.g., client device 700, FIGS. 7A-7F, 8A-8C, 10, and 11) with one or more processors, memory, and a display. The method includes: detecting a first trigger event and, in response to detecting the first trigger event, collecting an audio sample of environmental audio data with a microphone of the electronic device, where the environmental audio data is associated with a media item. The method includes transmitting information corresponding to the audio sample to a server and, in response to transmitting the information corresponding to the audio sample to the server, obtaining attribute information corresponding to the audio sample, where the attribute information includes metadata corresponding to the media item, a time indicator corresponding to a position of the audio sample relative to the media item, and stream information associated with the media item. The method also includes displaying at least a portion of the attribute information on the display. The method further includes detecting a second trigger event and, in response to detecting the second trigger event: determining a last obtained time indicator for the media item; streaming the media item based on the stream information in the received attribute information; and presenting the media item from the last obtained time indicator.

In some embodiments, an electronic device or computer system (e.g., client device 700, FIGS. 7A-7F, 8A-8C, 10, and 11) includes one or more processors, a display, and memory storing one or more programs for execution by the one or more processors, the one or more programs include instructions for performing the operations of the methods described herein. In some embodiments, a non-transitory computer readable storage medium storing one or more programs, the one or more programs comprising instructions, which, when executed by an electronic device or computer system (e.g., client device 700, FIGS. 7A-7F, 8A-8C, 10, and 11) with one or more processors and a display, cause the device or system to perform the operations of the methods described herein.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

In order to explain the embodiment of the present application and the technical program of conventional technology more clearly, the following will briefly introduce the necessary drawings described in the embodiment or current technology, obviously, the drawings in the following description are only some embodiments of the present application, for the common technicians of this field, they can also obtain other drawings according to these drawings without any creative labor.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In the following, combined with the attached drawings of the embodiment of the present application, the technical program of the embodiment of the present application will be described clearly and entirely, obviously, the described embodiments are only some of the embodiments, not all of them. Based on the embodiment of the present application, all the other embodiments obtained by the common technicians without any creative labor belong to the protective scope of this present application.

In some embodiments, the client device is any one of the following devices: a mobile phone, a smart phone, a tablet computer, a digital reader, a laptop, and so on.

The following will introduce the audio information query method provided by embodiments of the present application in detail combined with FIGS. 1-6.

Figure 1:
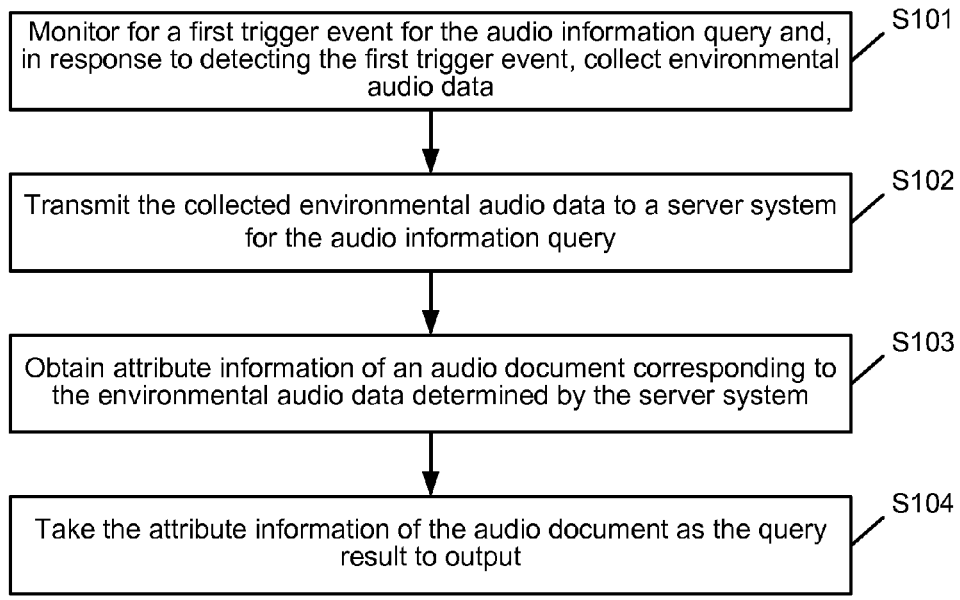
FIGS. 1-3 are flowchart diagrams of client-side audio information query methods in accordance with some embodiments.

FIG. 1 is a flowchart diagram of a client-side audio information query method in accordance with some embodiments. This embodiment elaborates the flow of the audio information query method performed at a client device with one or more processors and memory, including Steps S101-S104.

S101, the client device monitors for a first trigger event for the audio information query and, in response to detecting the first trigger event, collects environmental audio data.

In some embodiments, the environmental audio data includes audio data that is present in the environment where the client device is located. For example, environmental audio data includes, but is not limited to: a movie, a television play, a television program, a music radio station, a radio program, or environmental audio data delivered by a human being in the environment where the client device is located (e.g., hummed music or song segments), and the like.

In some embodiments, the first trigger event of the audio information query is a gravity induction event. In some embodiments, when the user intends to conduct the audio information query, the trigger action is be conducted by a user of the client device generating a gravity induction event (e.g., the user shakes the client device) while an application is being executed by the client device (e.g., an instant messenger application or other social media application environment) in order to trigger the client device to collect environmental audio data. For example, the client device is a mobile phone and a user of the phone user is watching a television program while an application environment is executed on the mobile phone. In this example, if the user wants to query attribute information of a media item corresponding to the music in the currently viewed television program, the user is enabled to trigger the audio information query function of the application environment by shaking the mobile phone to generate a gravity induction event, which triggers the mobile phone to collect environmental audio data including the music in the television program currently being viewed.

In some embodiments, the first trigger event of the audio information query is user selection of a particular button or affordance. In some embodiments, when the user intends to conduct the audio information query, the trigger action is be conducted by a user of the client device by selecting a particular button or affordance while an application is being executed by the client device (e.g., an instant messenger application or other social media application environment) in order to trigger the client device to collect environmental audio data. For example, the client device is a mobile phone and a user of the mobile phone hears a piece of music in the surrounding environment. In this example, if the user wants to query attribute information of a media item corresponding to the music, the user is enabled to invoke an application or enter an application environment and select a particular button (e.g., "search music" button) corresponding to an audio information query function provided by the application or application environment, which triggers the mobile phone to collect the environmental audio data of the music.

In this step, the collection process includes: in response to detecting, the first trigger event for the audio information query, the client device starts a recording function to transcribe the environmental audio data requested to be recognized by user. For example, the environmental audio data collected by the client device is digital audio with a sampling frequency of 8 KHz, PCM (Pulse-code modulation) type with 16 bit quantization.

S102, the client device transmits the collected environmental audio data to a server system for the audio information query.

In this step, the client device can process the collected environmental audio data, and transmit the processed environmental audio data to the server system for the audio information query. When the collected environmental audio data is first processed by the client device, the data size transmitted between the client device and the server system is effectively reduced.

S103, the client device obtains attribute information of a media item corresponding to the environmental audio data determined by the server system.

For example, the attribute information of the media item includes, but is not limited to: a name, artist information, album information, and lyrics.

S104, the client device takes the attribute information of the media item as the query result to output.

In some embodiments, the client device presents the attribute information as the output of the query so that the user can learn the complete information of the environmental audio data. For example, the client device displays or vocalizes the attribute information such as the song's title, singer, related album name, lyrics, and other information corresponding to the music requested to query.

When the client device of the embodiment of the present application detects the first trigger event of the audio information query, the client device automatically collects environmental audio data, and transmits this environmental audio data to a server system to perform the audio information query for attribute information of a media item corresponding to the collected environmental audio data. The audio information query operation is simple and fast, and it is not necessary for the user to manually input the basic information of the audio to be queried, which improves the efficiency of the audio information query and improves the accuracy and intelligence of the audio information query as well.

Figure 2:
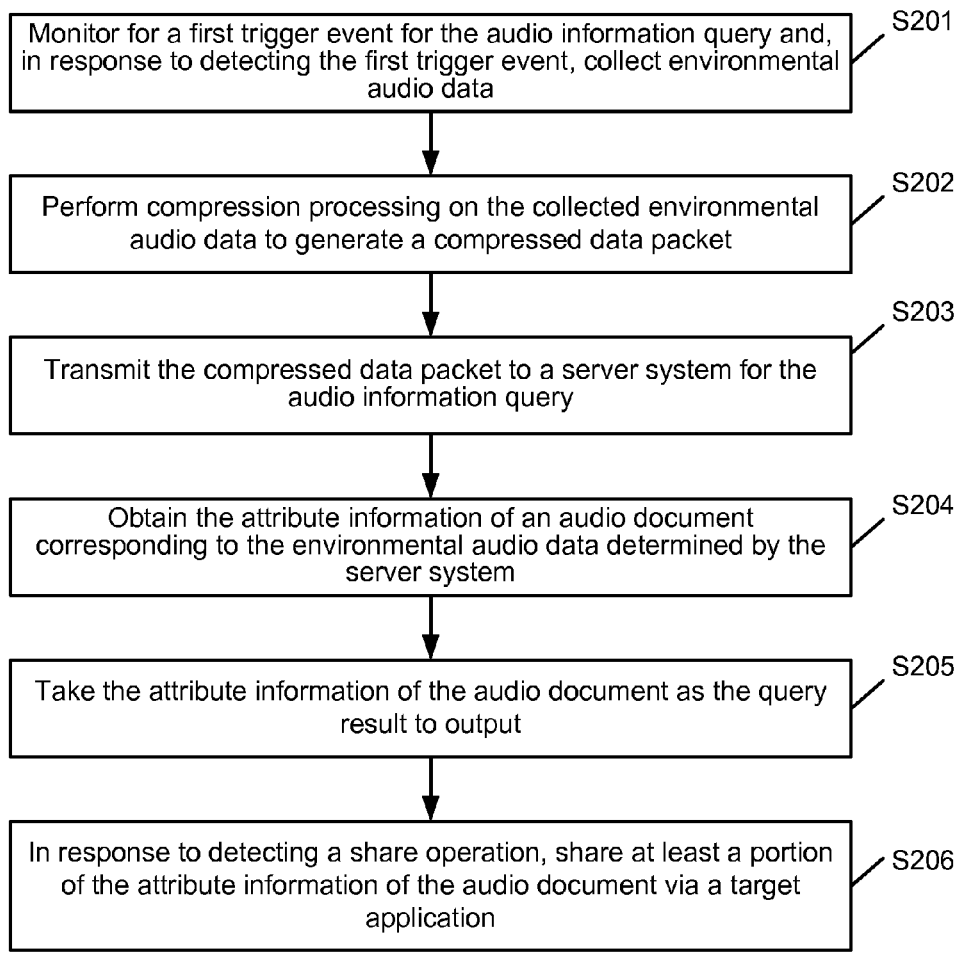

FIG. 2 is a flowchart diagram of another client-side audio information query method in accordance with some embodiments. This embodiment elaborates the flow of the audio information query method performed at a client device with one or more processors and memory, including Steps S201-S206.

S201, the client device monitors for a first trigger event for the audio information query and, in response to detecting the first trigger event, collects environmental audio data. For sake of brevity, refer to Step S101 of the embodiment shown in FIG. 1 for further explanation of Step S201.

S202, the client device performs compression processing on the collected environmental audio data to generate a compressed data packet.

S203, the client device transmits the compressed data packet to a server system for the audio information query.

Steps S202-S203 of this embodiment correspond to Step S102 of the embodiment shown in FIG. 1. In Step S202, the client device performs compression processing on the collected environmental audio data, to generate a compressed data packet. The compression processing reduces the total number of bytes of the collected environmental audio data, so as to reduce the total data size to be transmitted. In Step S203, the client device transmits the compressed data packet to the server system, which improves the efficiency of data transmission. In turn, when the server system performs the audio information query, the data content of the environmental audio data is restored by decompressing the compressed data packet, to ensure the accuracy of the audio information query.

S204, the client device obtains the attribute information of a media item corresponding to the environmental audio data determined by the server system.

S205, the client device takes the attribute information of the media item as the query result to output.

For sake of brevity, refer to Steps S103-S104 of the embodiment shown in FIG. 1 for further explanation of Steps S204-S205.

S206, in response to detecting a share operation, the client device shares at least a portion of the attribute information of the media item via a target application.

Among which, target application can be SNS (Social Networking Services) application, including: microblog, personal space, interactive site, forum, and other SNS application platforms. In this step, the user learns the complete information of the environmental audio data through the query result output by the client device. In some embodiments, if the user wants to share the searched information, a share operation can be selected from within the application or application environment. For example, the user selects a share button or affordance associated with a target application provided by the application, and the client device shares at least a portion of the attribute information for the media item via the target application. In some embodiments, the user selects one or more of a plurality of target applications for the share operation. In some embodiments, when the user does not select a specific target application a default or most commonly used target application is utilized for the share operation (e.g., the application being executed is used to share the attribute information).

When the client device of the embodiment of the present application detects the first trigger event of the audio information query, the client device automatically collects environmental audio data, and transmits this environmental audio data to a server system to perform the audio information query for attribute information of a media item corresponding to the collected environmental audio data. The audio information query operation is simple and fast, and it is not necessary for the user to manually input the basic information of the audio to be queried, which improves the efficiency of the audio information query and improves the accuracy and intelligence of the audio information query as well. Also, in this embodiment, sharing of the searched attribute information corresponding to the media item advances the convenience of social activities.

Figure 3:
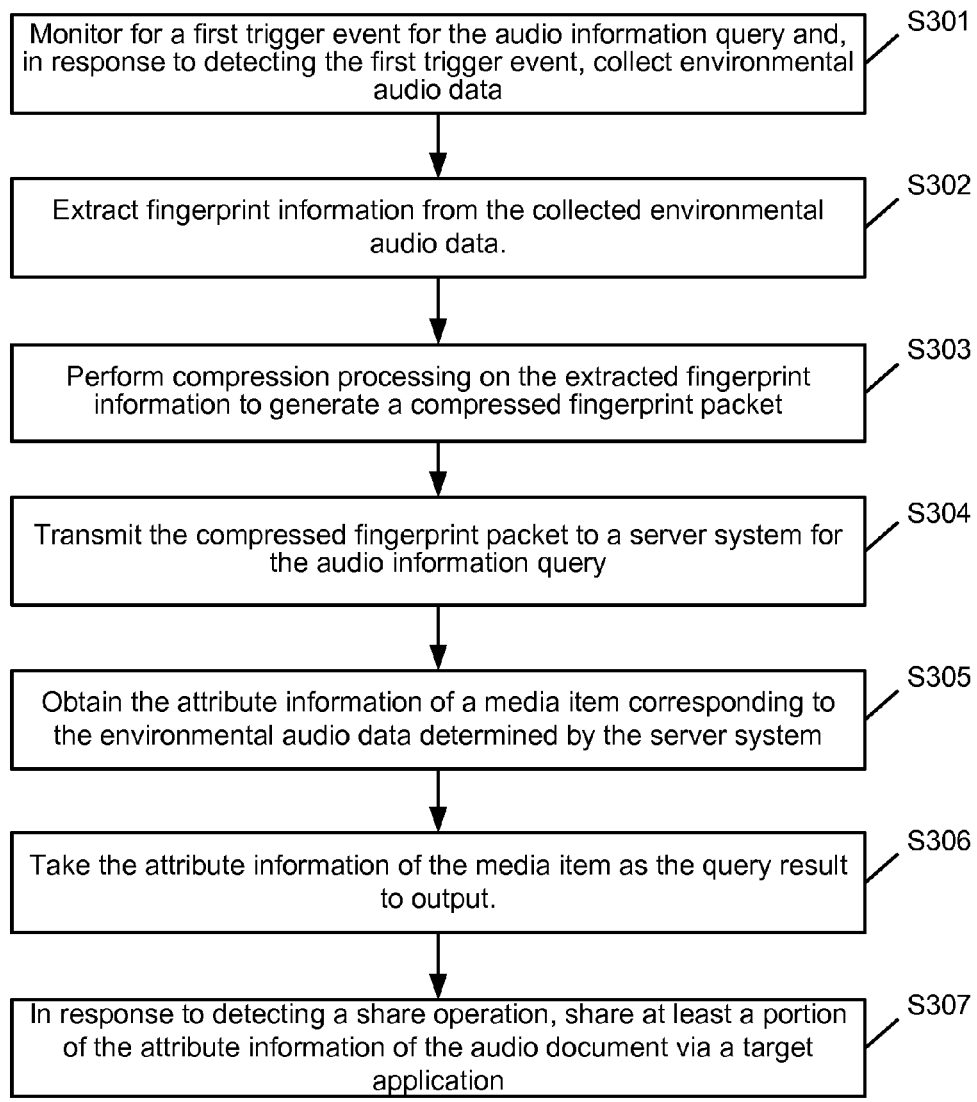

FIG. 3 is a flowchart diagram of another client-side audio information query method in accordance with some embodiments. This embodiment elaborates the flow of the audio information query method performed at a client device with one or more processors and memory, including Steps S301-S307.

S301, the client device monitors for a first trigger event for the audio information query and, in response to detecting the first trigger event, collects environmental audio data.

S302, the client device extracts fingerprint information from the collected environmental audio data.

In some embodiments, the fingerprint information refers to a compact digital signature representing important acoustic characteristics of the environmental audio data and is based on content of the collected environmental audio data. In some embodiments, the fingerprint information requires perceived (or content) similarity, with distinguishability, robustness, granularity and other basic characteristics. Among which, distinguishability means that the fingerprint information of different audio data should have great differences, while the fingerprint information of an original record and a copied record of the same audio data should have small differences; robustness means that the audio data can be recognized after being processed by multiple audio format conversions, channel noise interference, and so on; and granularity means that the fingerprint information can be recognized even for a short sample of environmental audio data (e.g., the length of audio data is less than 5 or 10 seconds).

For example, easy calculation is required to extract the fingerprint information of audio data at the client device, so quick, real-time fingerprint information calculation can be realized even at a client-side with limited calculation resources. For another example, in the wireless network application realm, data compactness is required for fingerprint information, that is, the data size should be small to transmit the fingerprint information over the wireless network. In this step, the extraction of the fingerprint information by the client device is performed according to an extraction algorithm. In some embodiments, the extraction algorithm includes but is not limited to: audio fingerprint extraction algorithm based on a frame information characteristic vector; or audio fingerprint extraction algorithm based on a peak value characteristic point. In some embodiments, the fingerprint information extracted in this step is expressed as a fingerprint sequence; each fingerprint item in the fingerprint sequence can be expressed as (t, hashcode). Among which, the hashcode represents a hashcode with a fixed number of bits, which includes important acoustic characteristics of the environmental audio data, and t refers to a time point (e.g., a timestamp) corresponding to the hashcode.

S303, the client device performs compression processing on the extracted fingerprint information to generate a compressed fingerprint packet.

S304, the client device transmits the compressed fingerprint packet to a server system for the audio information query.

Steps S302-S304 of this embodiment correspond to Step S102 of the embodiment shown in FIG. 1. In Step S302, the client device extracts fingerprint information corresponding to the environmental audio data. In some embodiments, the fingerprint information of the environmental audio data refers to a compact digital signature which represents important acoustic characteristics of the environmental audio data and is based on the content of the environmental audio data. Generally, the total data size of the fingerprint information of the mentioned environmental audio data is less than the total data size of the collected environmental audio data. In Step S303, the client device performs compression processing on the extracted fingerprint information to generate a compressed fingerprint packet. The compression processing reduces the total number of bytes of the extracted fingerprint information, so as to reduce the total data size to be transmitted. In Step S304, the client device transmits the compressed fingerprint packet to the server system, which improves the efficiency of data transmission. In turn, when the server system performs the audio information query, the fingerprint information of the environmental audio data is restored by decompressing the compressed fingerprint packet, to ensure the accuracy of the audio information query.

S305, the client device obtains the attribute information of a media item corresponding to the environmental audio data determined by the server system.

S306, the client device takes the attribute information of the media item as the query result to output.

S307, in response to detecting a share operation, the client device shares at least a portion of the attribute information of the media item via a target application.

For sake of brevity, refer to Steps S201 and S204-S206 of the embodiment shown in FIG. 2 for further explanation of Steps S301 and S305-S307.

When the client device of the embodiment of the present application detects the first trigger event for the audio information query, the client device automatically collects environmental audio data, and transmits this environmental audio data to a server system to perform the audio information query for attribute information of a media item corresponding to the collected environmental audio data. The audio information query operation is simple and fast, and it is not necessary for the user to manually input the basic information of the audio to be queried, which improves the efficiency of the audio information query and improves the accuracy and intelligence of the audio information query as well. Also, in this embodiment, sharing of the searched attribute information corresponding to the media item advances the convenience of social activities.

In the embodiment shown in FIG. 2 and the embodiment shown in FIG. 3, the processing performed on the collected environmental audio data prior to transmission to the server system are different. In the embodiment shown in FIG. 2, the processing performed by the client device includes the compression process for the collected environmental audio data. However, in the embodiment shown in FIG. 3, the processing performed by the client device includes: the extraction process of the fingerprint information; and the compression process for fingerprint information. Adopting the embodiment shown in FIG. 2, the processing load of client-side is relatively small, applicable for the low-end client devices with limited processing capacity. Adopting the embodiment shown in FIG. 3, the client device is required to calculate fingerprint information corresponding to the collected environmental audio data, which increases the processing load on client device, but improves transmission efficiency by more effectively reducing the data size transmitted to the server system. For example, selection of one of the embodiments shown in the FIGS. 1-3 depends on the processing capacity of the client device, the bandwidth resources of the network, or the selection of the user.

It should be noted that, in the embodiments shown in FIGS. 1-3, attribute information of the media item determined by the server system and received by the client device, includes attribute information of a media item (such as a song, or an audio segment in a television play), or attribute information of multiple media items (such as multiple songs, or the audio segments of multiple television plays), and the client device is enabled to select to output attribute information of the multiple media items, or attribute information of a portion of the media items when containing the attribute information of multiple media items. In addition, when the server system fails to determine attribute information of the media item corresponding to the environmental audio data, the server system returns a query failure message to the client device, and the client device can present the message to notify the user of the audio information query's failure.

Figure 4:
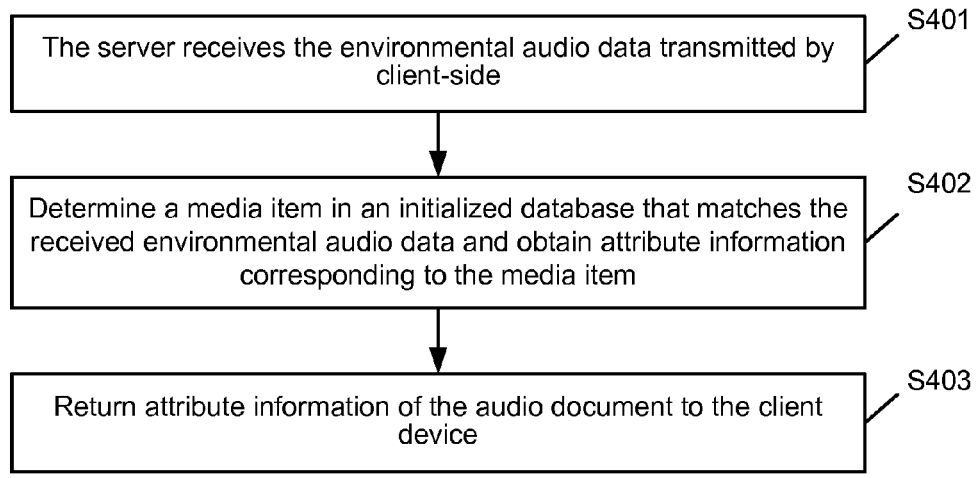
FIGS. 4-6 are flowchart diagrams of server-side audio information query methods in accordance with some embodiments.

FIG. 4 is a flowchart diagram of a server-side audio information query method in accordance with some embodiments. This embodiment elaborates the flow of the audio information query method performed at a server system with one or more processors and memory, including Steps S401-S403.

S401, the server systems receives environmental audio data transmitted by a client device.

In some embodiments, the server system receives at least a portion of environmental audio data transmitted by the client device, where the client device collects environmental audio data in response to detecting a first trigger event. In some embodiments, the server system receives a compressed data packet transmitted by the client device, where the compressed data packet is generated by a compression process performed on the environmental audio data by the client device. In some embodiments, the server system receives a compressed fingerprint packet transmitted by the client device, where the compressed fingerprint packet is generated by a compression process performed on fingerprint information extracted from environmental audio data by the client device.

S402, the server system determines a media item in an initialized database that matches the received environmental audio data and obtains attribute information corresponding to the media item.

In some embodiments, the initialized database stores a plurality of media items or representations of the media items or links (e.g., URLs) to the media items. In some embodiments, the initialized database also stores marks, fingerprint information, and attribute information corresponding to the plurality of media items. In some embodiments, the media items stored in the initialized database include: audio segments of a movie, audio segments of a television play, audio segments of a television program, songs, music and so on. In some embodiments, the mark of a media item is expressed by TrackID. For example, the mark of media item 1 is expressed as TrackID-1 and the mark of media item 2 is expressed as TrackID-2. In this example, a TrackID is used as a unique mark for a media item. In some embodiments, the fingerprint information of a media item refers to a compact digital signature representing important acoustic characteristics of the media item based on the content of the media item. In some embodiments, attribute information of a media item includes but is not limited to: the name, artist information, album information, and lyrics.

S403, the server system returns attribute information of the media item to the client device.

The server system returns attribute information of media item corresponding to the environmental audio data to the client device. Subsequently, the client device is enabled to take the attribute information of media item as the query result to output, which makes it possible for the user to obtain complete information of the environmental audio data.

When the server system of the embodiment of the present application receives environmental audio data transmitted by client device, the server system conducts the audio information query for the environmental audio data based on the initialized database to obtain attribute information of a media item corresponding to the environmental audio data and returns the attribute information to the client device. The query process is performed at a background server, and it is not necessary for the user to manually input the basic information of the audio to be queried, which improves the efficiency of the audio information query and improves the accuracy and intelligence of the audio information query as well.

Figure 5:
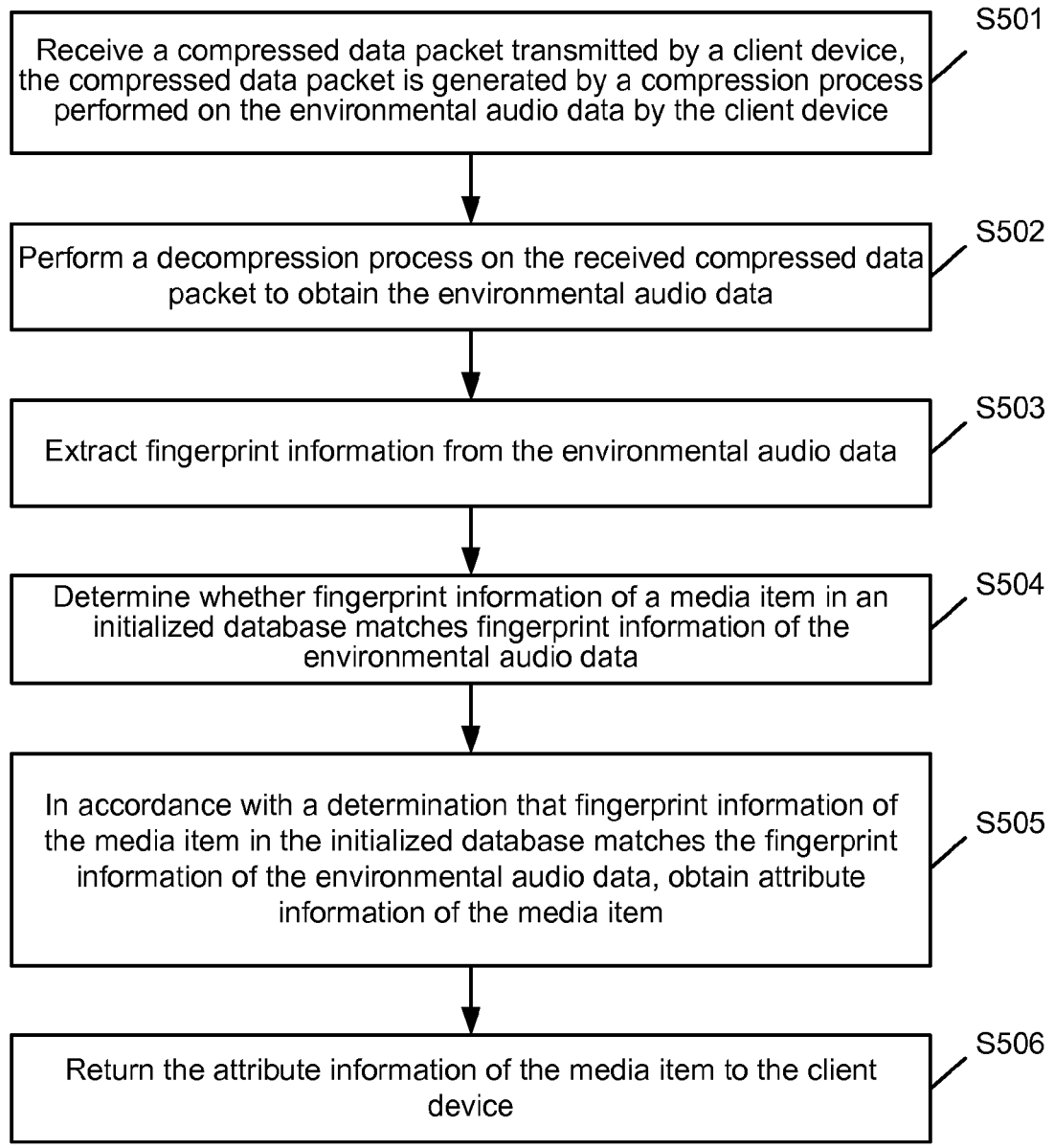

FIG. 5 is a flowchart diagram of another server-side audio information query method in accordance with some embodiments. This embodiment elaborates the flow of the audio information query method performed at a server system with one or more processors and memory, including Steps S501-S506.

S501, the server system receives a compressed data packet transmitted by a client device, the compressed data packet is generated by a compression process performed on the environmental audio data by the client device.

S502, the server system performs a decompression process on the received compressed data packet to obtain the environmental audio data.

The decompression process of the compressed data packet performed by the server system and the compression process of the collected environmental audio data performed by the client device are the inverse processes of one another. The environmental audio data obtained by the decompression process is the environmental audio data collected by the client device. For example, the obtained environmental audio data is digital audio with a sampling frequency of 8 KHz, PCM type with 16 bit quantization.

S503, the server system extracts fingerprint information from the environmental audio data.

In this step, the extraction of the fingerprint information by the client device is performed according to an extraction algorithm. In some embodiments, the extraction algorithm includes but is not limited to: audio fingerprint extraction algorithm based on a frame information characteristic vector; or audio fingerprint extraction algorithm based on a peak value characteristic point. In some embodiments, the fingerprint information extracted in this step is expressed as a fingerprint sequence, each fingerprint item in the fingerprint sequence can be expressed as (t, hashcode). Among which, the hashcode represents a hashcode with a fixed number of bits, which includes important acoustic characteristics of the environmental audio data, and t refers to a time point (e.g., a timestamp) corresponding to the hashcode.

S504, the server system determines whether fingerprint information of a media item in an initialized database matches fingerprint information of the environmental audio data.

In some embodiments, the initialized database stores a plurality of media items or representations of the media items or links (e.g., URLs) to the media items. In some embodiments, the initialized database also stores marks, fingerprint information, and attribute information corresponding to the plurality of media items. In this step, a match between fingerprint information of the environmental audio data and fingerprint information of a media item occurs when: fingerprint information of the media item is identical to the fingerprint information of mentioned environmental audio data; or a degree if similarity between fingerprint information of the media item and the fingerprint information of mentioned environmental audio data meets or exceeds a predefined similarity threshold. For example, when the predefined similarity threshold requires 90% similarity, if there is fingerprint information of a media item in the initialized database whose similarity degree with the fingerprint information of environmental audio data meets or exceeds 90%, then the fingerprint information of the media item matches the fingerprint information of the environmental audio data.

S505, in accordance with a determination that fingerprint information of the media item in the initialized database matches the fingerprint information of the environmental audio data, the server system obtains attribute information of the media item.

S506, the server system returns the attribute information of the media item to the client device. For sake of brevity, refer to Step S403 of the embodiment shown in FIG. 4 for further explanation of Step S506.

When the server system of the embodiment of the present application receives environmental audio data transmitted by client device, the server system conducts the audio information query for the environmental audio data based on the initialized database to obtain attribute information of a media item corresponding to the environmental audio data and returns the attribute information to the client device. The query process is performed at a background server, and it is not necessary for the user to manually input the basic information of the audio to be queried, which improves the efficiency of the audio information query and improves the accuracy and intelligence of the audio information query as well.

Figure 6:
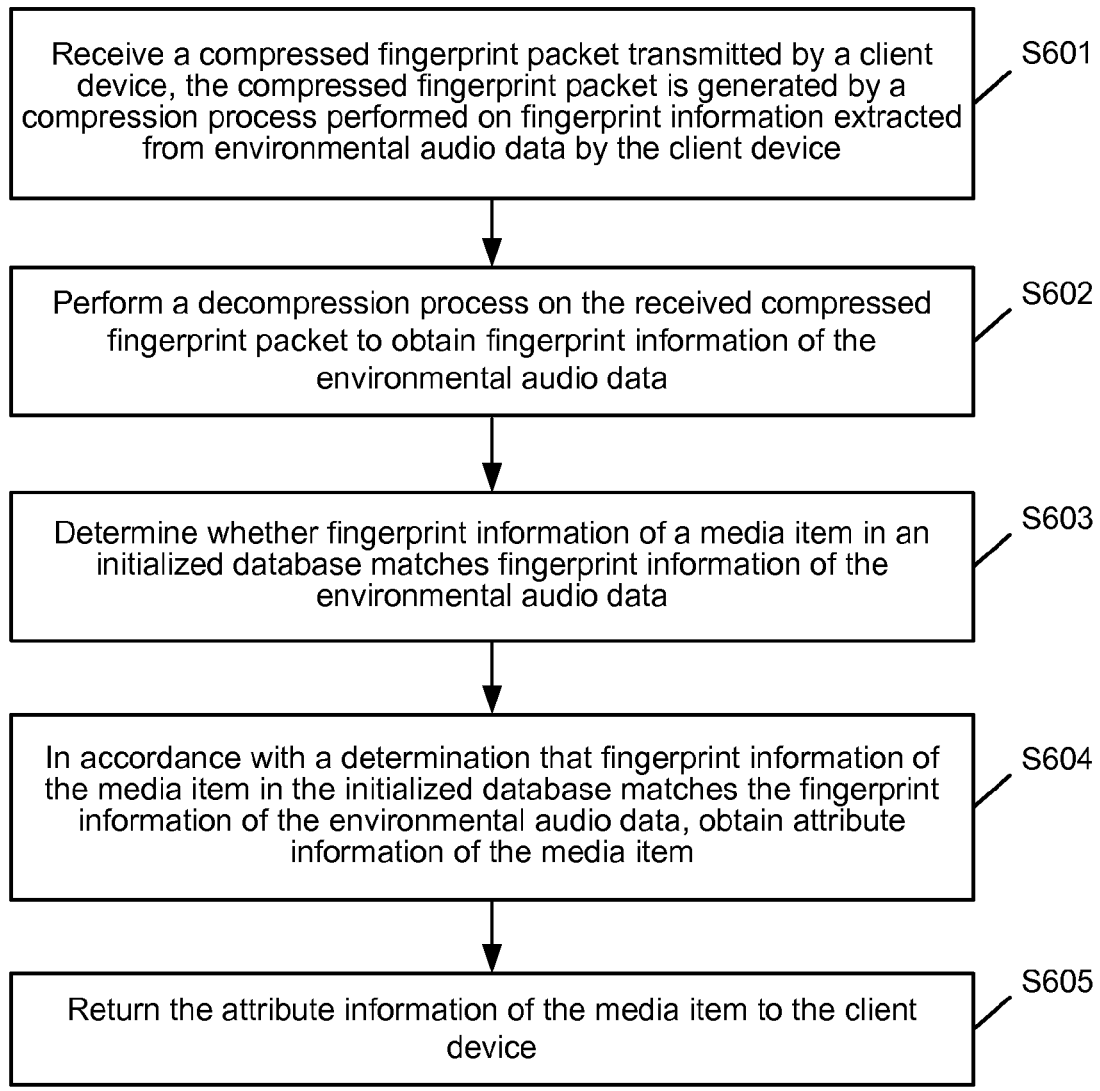

FIG. 6 is a flowchart diagram of another server-side audio information query method in accordance with some embodiments. This embodiment elaborates the flow of the audio information query method performed at a server system with one or more processors and memory, including Steps S601-S605.

S601, the server system receives a compressed fingerprint packet transmitted by a client device, the compressed fingerprint packet is generated by a compression process performed on fingerprint information extracted from environmental audio data by the client device.

S602, the server system performs a decompression process on the received compressed fingerprint packet to obtain fingerprint information of the environmental audio data.

The decompression process of the compressed fingerprint packet performed by the server system and the compression process of the extracted fingerprint information of the collected environmental audio data performed by the client device are the inverse processes of one another. In some embodiments, the fingerprint information extracted in this step is expressed as a fingerprint sequence, each fingerprint item in the fingerprint sequence can be expressed as (t, hashcode). Among which, the hashcode represents a hashcode with a fixed number of bits, which includes important acoustic characteristics of the environmental audio data, and t refers to a time point (e.g., a timestamp) corresponding to the hashcode.

S603, the server system determines whether fingerprint information of a media item in an initialized database matches fingerprint information of the environmental audio data.

S604, in accordance with a determination that fingerprint information of the media item in the initialized database matches the fingerprint information of the environmental audio data, the server system obtains attribute information of the media item.

S605, the server system returns the attribute information of the media item to the client device.

For sake of brevity, refer to Steps S504-S506 of the embodiment shown in FIG. 5 for further explanation of Steps S603-S605.

When the server system of the embodiment of the present application receives environmental audio data transmitted by client device, the server system conducts the audio information query for the environmental audio data based on the initialized database to obtain attribute information of a media item corresponding to the environmental audio data and returns the attribute information to the client device. The query process is performed at a background server, and it is not necessary for the user to manually input the basic information of the audio to be queried, which improves the efficiency of the audio information query and improves the accuracy and intelligence of the audio information query as well.

The embodiment shown in FIG. 5 corresponds to the embodiment shown in FIG. 2, and the embodiment shown in FIG. 6 corresponds to the embodiment shown in FIG. 3. In the embodiment shown in FIG. 5 and the embodiment shown in FIG. 6, the processing performed by the server system before the audio information query is different. In the embodiment shown in FIG. 5, the processing performed by the server system includes decompression of the data compressed packet to obtain environmental audio data and extraction of fingerprint information from the environmental audio data because the server system receives the compressed data packet from the client device. However, in the embodiment shown in FIG. 6, because receiving the fingerprint compressed packet from client-side, the processing performed by the server system includes decompression of the compressed fingerprint packet.

It should be noted that, in the embodiment shown in FIGS. 4-6, attribute information of the media item determined by the server system and received by the client device, includes attribute information of a media item (such as a song, or an audio segment in a television play), or attribute information of multiple media items (such as multiple songs, or the audio segments of multiple television plays), and the client device is enabled to select to output attribute information of the multiple media items, or attribute information of a portion of the media items when containing the attribute information of multiple media items. In addition, when the server system fails to determine attribute information of the media item corresponding to the environmental audio data, the server system returns a query failure message to the client device, and the client device can present the message to notify the user of the audio information query's failure.

Attention is now directed towards embodiments of user interfaces ("UI") and associated processes that may be implemented on a respective client device 700 with one or more speakers 702 enabled to output sound, one or more microphones 704 enabled to receive sound input, and a touch screen 706 enabled to receive one or more contacts and display information (e.g., media content, web pages and/or user interfaces for application programs). FIGS. 7A-7F illustrate exemplary user interfaces for performing an audio information query in accordance with some embodiments. FIGS. 7A-7F show user interface 708 displayed on client device 700 (e.g., a mobile phone); however, one skilled in the art will appreciate that the user interfaces shown in FIGS. 7A-7F may be implemented on other similar computing devices. The embodiments described above with reference to FIGS. 1-6 provide a basis for the embodiments described below with reference to FIGS. 7A-7F. The user interfaces in FIGS. 7A-7F are used to illustrate the processes described herein, including the processes described with respect to FIGS. 1-6 and 13.

Figure 7A:
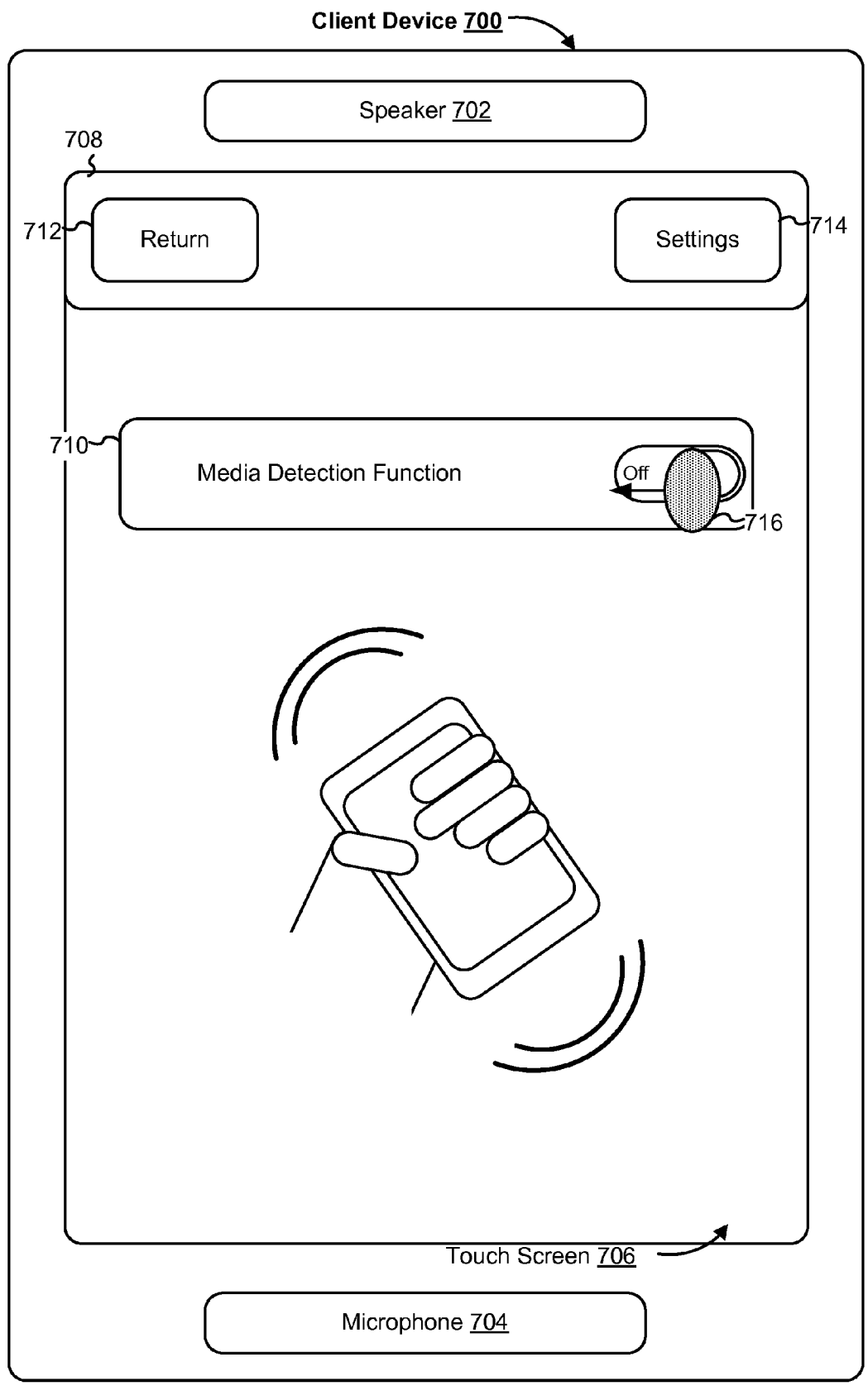
FIGS. 7A-7F are interfaces illustrating a method of performing an audio information query in accordance with some embodiments.

FIG. 7A illustrates client device 700 displaying control box 710 for enabling a media detection function of an application or application environment in user interface 708 of touch screen 706. In FIG. 7A, control box 710 includes an on/off switch, which, when activated (e.g., by a touch input from a user), causes client device 700 to enable the media detection function which enables client device 700 to perform an audio information query on environmental audio data. In FIG. 7A, user interface 708 also includes return affordance 712, which, when activated (e.g., by a touch input from a user), causes client device 700 to display a functions panel for the application or application environment, which includes a list of functions of the application or application environment, or a settings interface of the application or application environment. In FIG. 7A, user interface 708 also includes settings affordance 714, which, when activated (e.g., by a touch input from a user), causes client device 700 to display a settings panel for the media detection function. In some embodiments, the settings panel for the media detection function includes a list of events or software/hardware states of client device 700 for the first trigger event, a list of events or software/hardware states of client device 700 for the second trigger event, settings for changing the periodicity for collecting samples of environmental audio data, settings for changing the information transmitted to server system for the audio information query (e.g., an unprocessed sample of the environmental audio data, a compressed sample of the environmental audio data, or compressed fingerprint information of the sample of the environmental audio data), and other settings related to the media detection function. In FIG. 7A, the on/off switch in control box 710 is in the off position.

FIG. 7A also illustrates client device 700 detecting a right-to-left swipe gesture with contact 716 on touch screen 706 at a location corresponding to the on/off switch in control box 710. In response to detecting the right-to-left swipe gesture with contact 716, client device 700 enables the media detection function and monitors for a first trigger event.

Figure 7B:
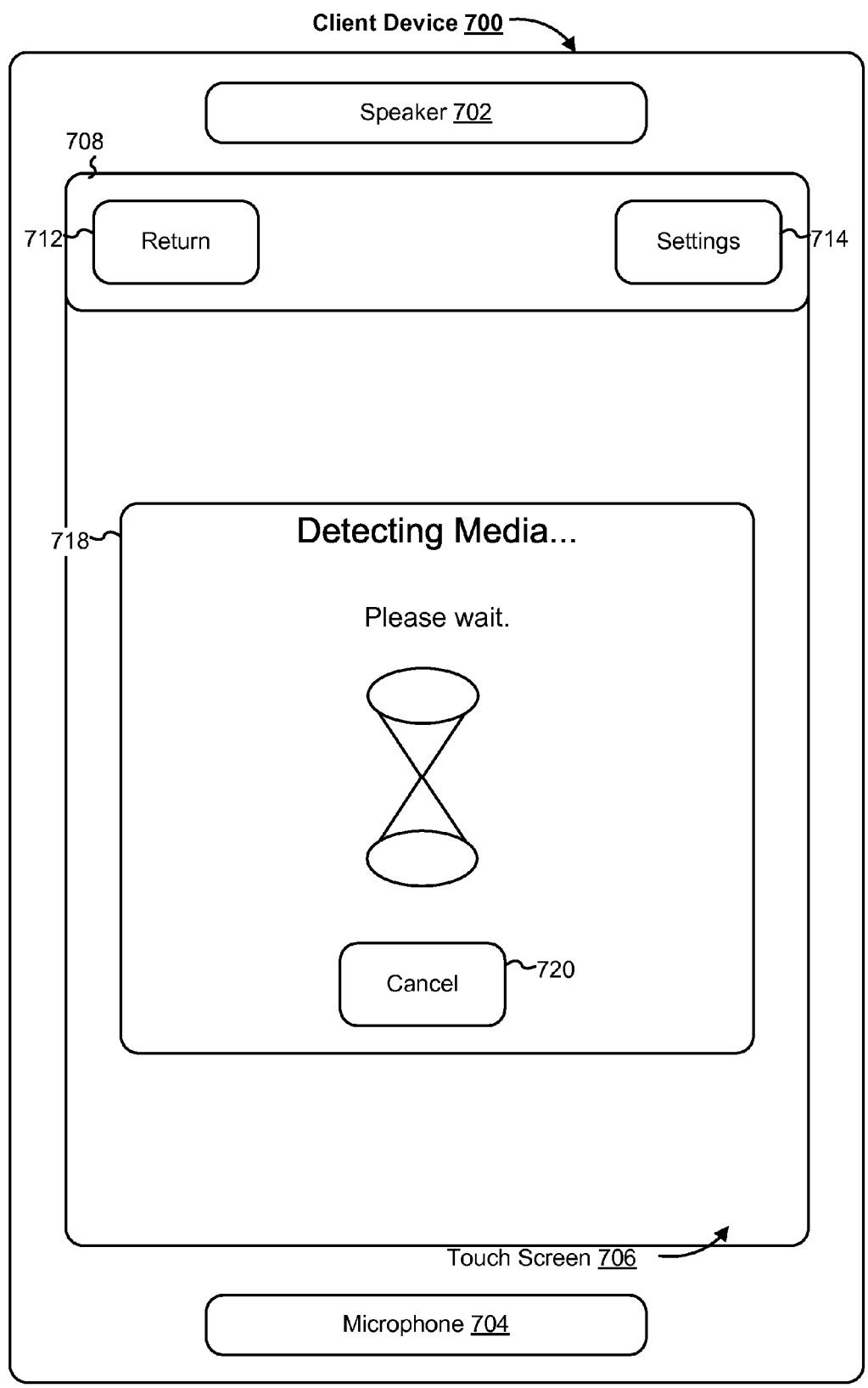

FIG. 7B illustrates client device 700 displaying notification 718 in user interface 708 in response to detecting a first trigger event after the media detection function was enabled in FIG. 7A. In response to detecting the first trigger event, client device 700 collects an audio sample of environmental audio data with microphone 704. After collecting the audio sample, client device 700 transmits information corresponding to the audio sample of environmental audio data to server system 900 for an audio information query. For example, the audio information query is performed in order to obtain attribute information for a media item corresponding to the environmental audio data (e.g., audio being played in the environment in which client device 700 is located).

In FIG. 7B, notification 718 is displayed in user interface 708 prior to obtaining attribute information (e.g., the output of the audio information query) corresponding to the collected audio sample of environmental audio data. In FIG. 7B, notification 718 includes text instructing the user to wait while the audio information query is performed and also cancel affordance 720, which, when activated (e.g., by a touch input from a user of client device 700) causes client device 700 to abort the audio information query and cease to display notification 718.

Figure 7C:
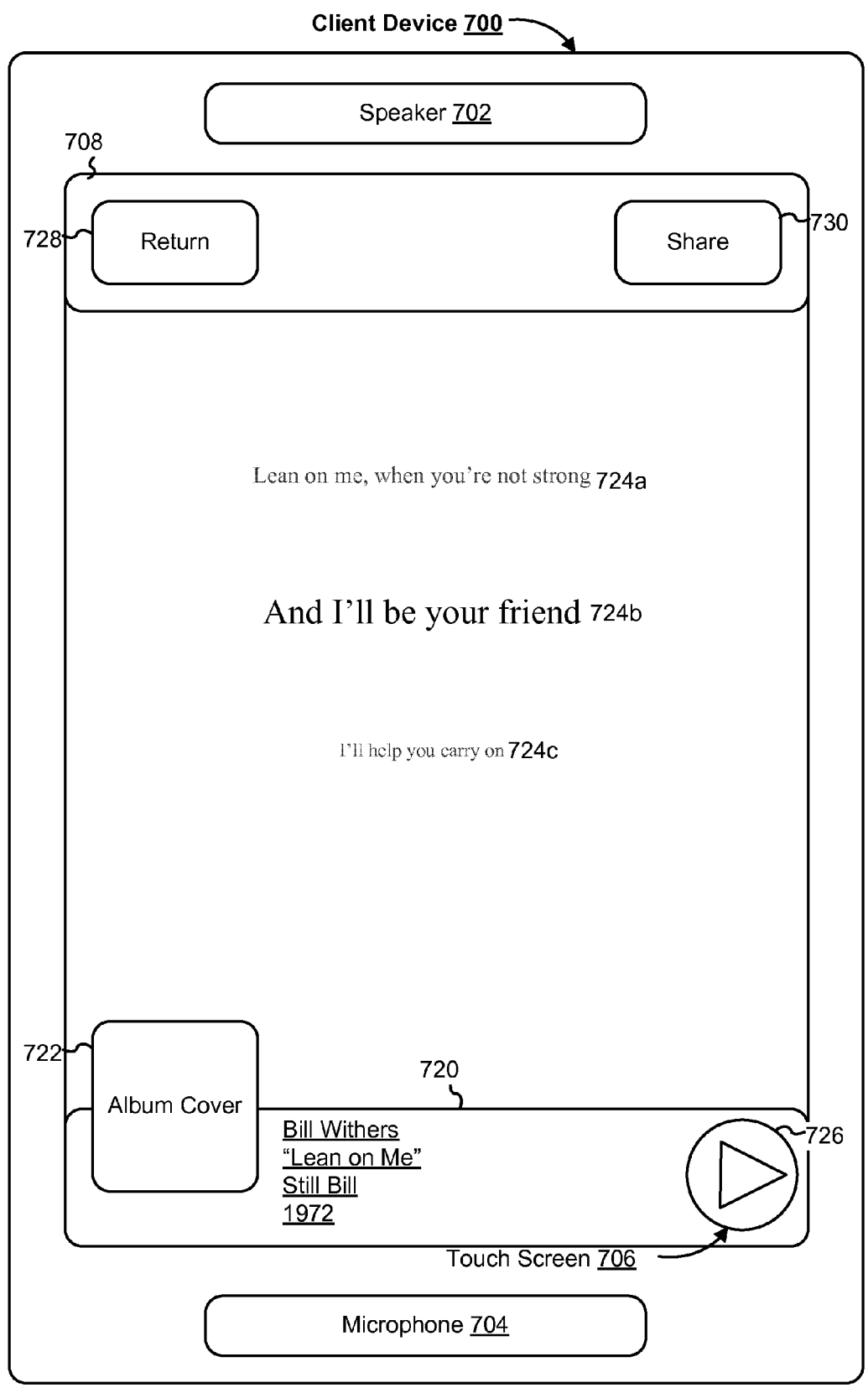

FIG. 7C illustrates client device 700 displaying an audio information query result interface with attribute information for a media item that corresponds to the collected first audio sample of environmental audio data after obtaining the attribute information from server system 900. In FIG. 7C, attribute information displayed in user interface 708 corresponding to the environmental audio data includes the artist name (e.g., Bill Withers), song title, (e.g., Lean on Me), album name (e.g., Still Bill), and release data (e.g., 1972) in banner 720. In FIG. 7C, the attribute information displayed in user interface 708 also includes an album cover image 722 and lyrics 724, where lyrics 724 are synchronized with the environmental audio data based on a time indicator provided in the attribute information. In FIG. 7C, a current line or sentence of lyrics 724b for the media item is displayed in a primary display position, the previous line or sentence of lyrics 724a is faded out, and a next line or sentence of lyrics 724c is faded in.

FIG. 7C also illustrates client device 700 displaying play affordance 726, which, when activated (e.g., by a touch input from a user of client device 700) causes client device 700 to resolve or execute the URL link or stream information in the attribute information so as to cause playback of the media item via one or more speaks 702 (or through a headphone jack or over a wireless protocol to one or more external speakers) from the most recent time indicator or timestamp so as to synchronize playback with the environmental audio data. FIG. 7C further illustrates client device 700 displaying return affordance 728, which, when activated (e.g., by a touch input from a user of client device 700) causes client device 700 to cease to display the audio information query result interface and share affordance 730, which, when activated (e.g., by a touch input from a user of client device 700) causes client device 700 to display a sharing interface (e.g., shown in FIG. 7F).

Figure 7D:
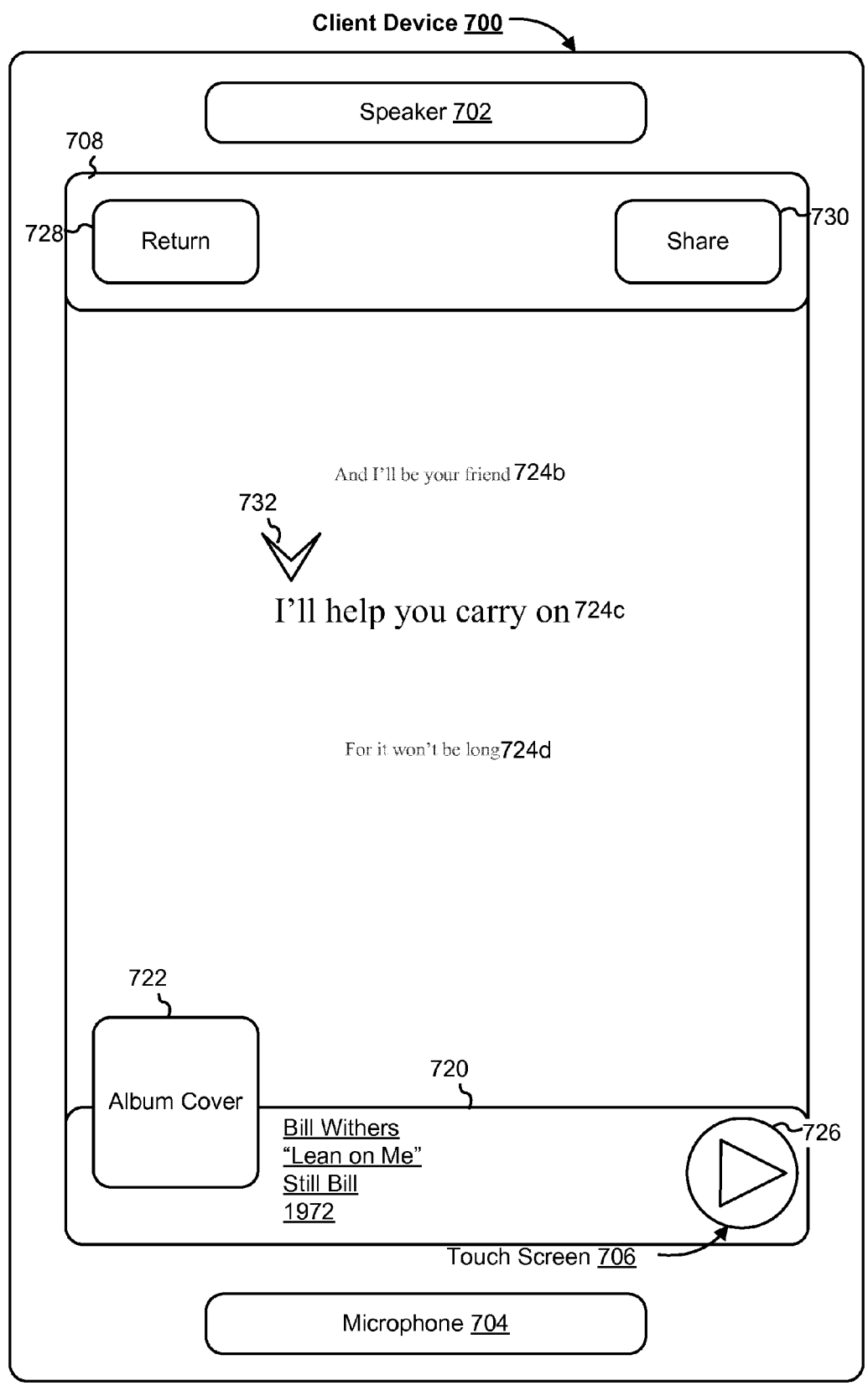

FIG. 7D illustrates client device 700 displaying current line or sentence of lyrics 724c for the media item in a primary display position, fading out the previous line or sentence of lyrics 724b, and fading in a next line or sentence of lyrics 724d. FIG. 7D also illustrates client device 700 displaying a focus indicator 732 (e.g., an arrow or chevron) is displayed above the first word of the current line or sentence of lyrics 724c (e.g., the contraction "I'll") so as to draw the attention of the user of client device 700 to the current word of the media item. In some embodiments, the focus indicator is an additional element displayed on user interface 708 (e.g., an arrow) that draws the user's attention to the current word. In some embodiments, the focus indicator changes a visual characteristic of the current word (e.g., emboldens, italicizes, increases font size, or capitalizes the characters of the current word) to draw the user's attention to the current word. For example, in FIGS. 7D-7E focus indicator 732 allows the user to follow along with the lyrics of the media item in a manner akin to karaoke or a sing-a-long.

Figure 7E:
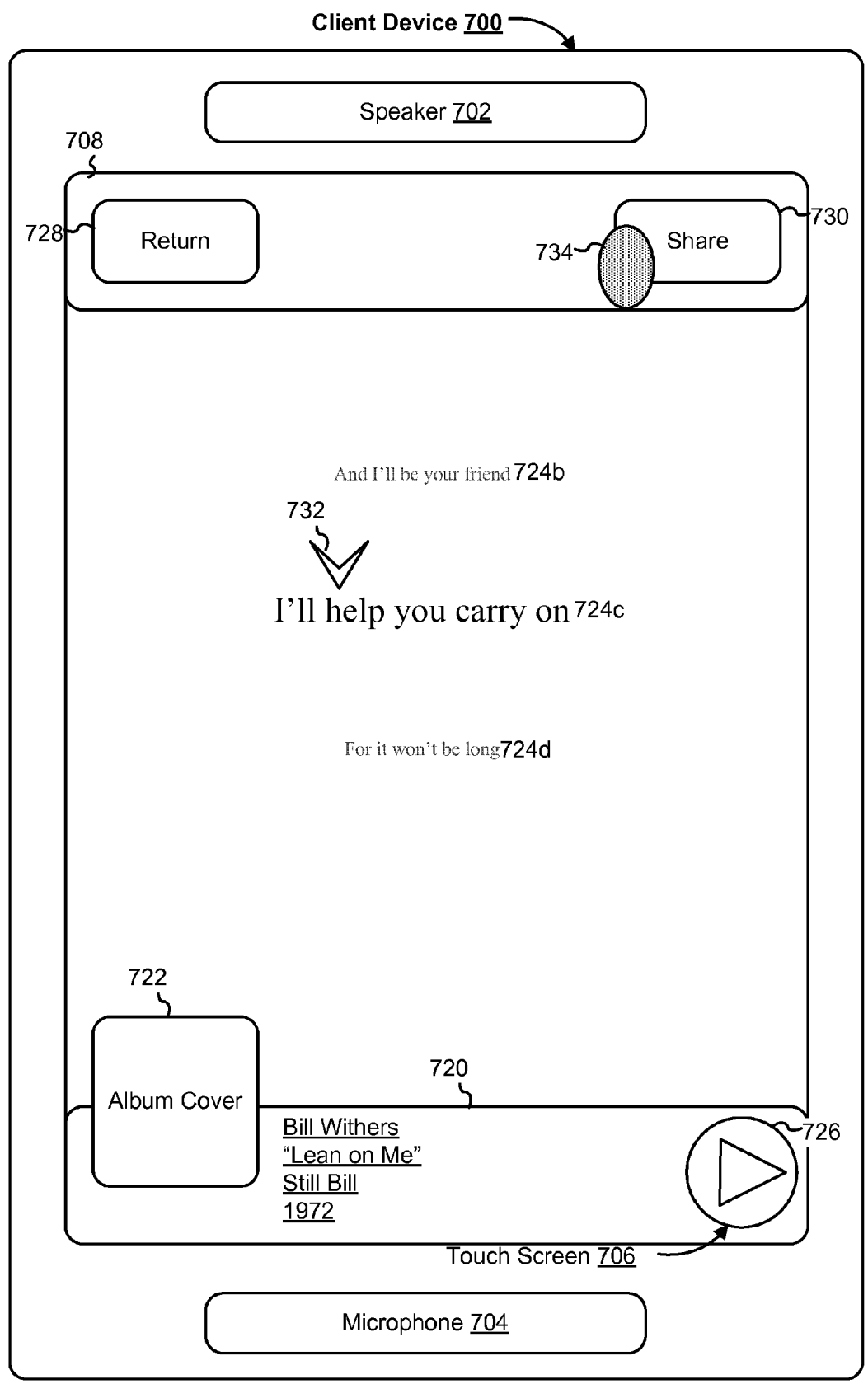

FIG. 7E illustrates client device 700 displaying focus indicator 732 above the second word of the current line or sentence of lyrics 724c (e.g., "help") so as to draw the attention of the user of client device 700 to the current word of the media item. FIG. 7E also illustrates client device 700 detecting contact 734 on touch screen 706 at a location corresponding to share affordance 730.

Figure 7F:
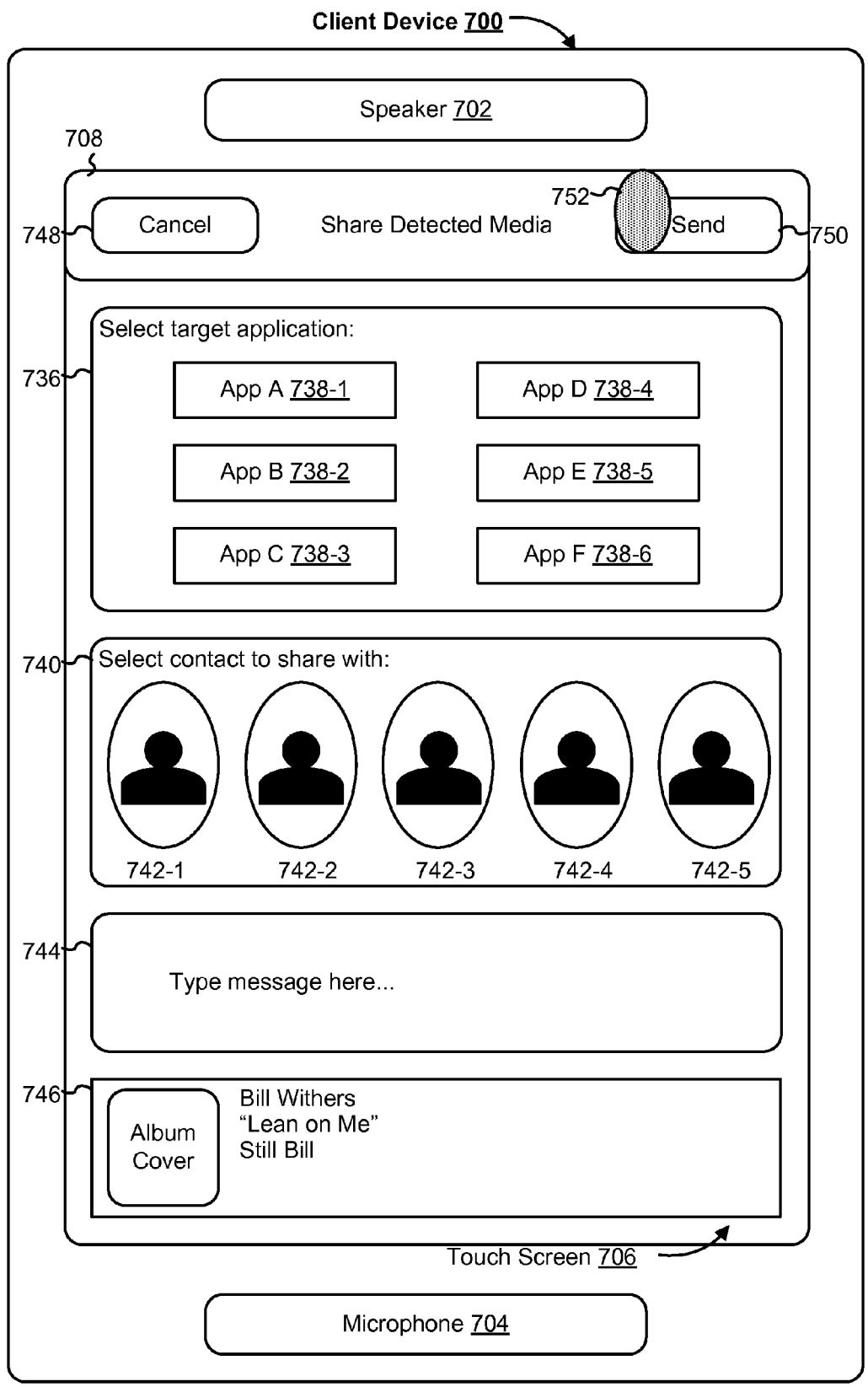

FIG. 7F illustrates client device 700 displaying a sharing interface on touch screen 706 in response to detecting contact 734 in FIG. 7E. In some embodiments, the sharing interface enables the user of client device 700 to share at least a portion of the obtained the attribute information for the detected media item with another user using a target application (e.g., the current application or application environment or a selected social networking service). In some embodiments, the sharing interface also enables the user of client device 700 to share a URL link or stream information in the obtained the attribute information so that the recipient can stream or listen to the media item.

In FIG. 7F, the sharing interface includes target application selection box 736 with a plurality of selectable target application icons 738 corresponding to different applications (e.g., social networking services) by which to share the portion of the attribute information. In FIG. 7F, the sharing interface also includes contacts box 740 with a plurality of selectable contact icons 742 corresponding to contacts (e.g., contacts stored in the user's contacts library on client device 700) with whom to share the portion of the attribute information. In FIG. 7F, the sharing interface further includes message box 744 which enables the user to input (e.g., via a virtual keyboard or audibly when client device 700 includes speech recognition technology) a message to be included with the shared attribute information, and attribute information box 746 displaying the attribute information to be shared with the selected contact. FIG. 7F also illustrates client device 700 displaying cancel affordance 748, which, when activated (e.g., by a touch input from a user of client device 700) causes client device 700 to cancel the sharing operation and redisplay the audio information query result interface in FIG. 7E. FIG. 7F further illustrates client device 700 displaying a send affordance 750, which, when activated (e.g., by a touch input from a user of client device 700) causes client device 700 to share at least a portion of the attribute information. In some embodiments, if no target application 738 is selected client device 700 shares the attribute information via the current application or application environment or a most frequently used social networking service.

FIG. 7F further illustrates detecting contact 752 at a location corresponding to send affordance 750. In response to detecting selection of send affordance 750, client device 700 shares the attribute information displayed in attribute information box 746 (and, optionally, a URL or stream information for playing the media item) and the message in message box 744 with one or more contacts 742 selected in contacts box 740 via one or more target applications 738 selected in target application selection box 736.

Figure 8A:
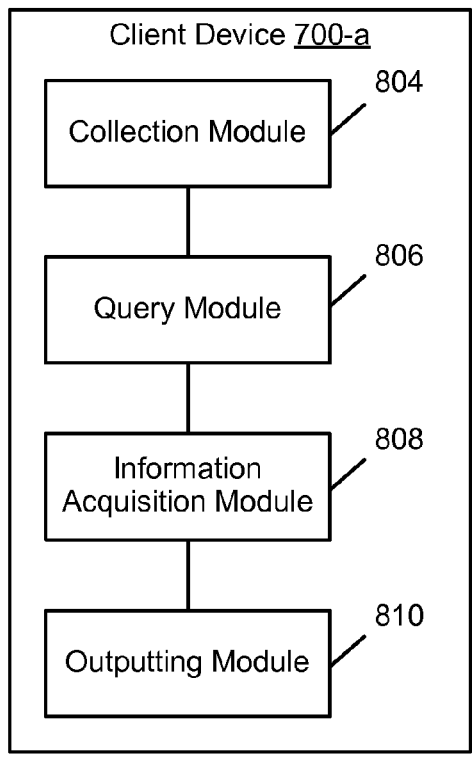
FIGS. 8A-8B are structural schematic diagrams of client devices in accordance with some embodiments.
Figure 8B:
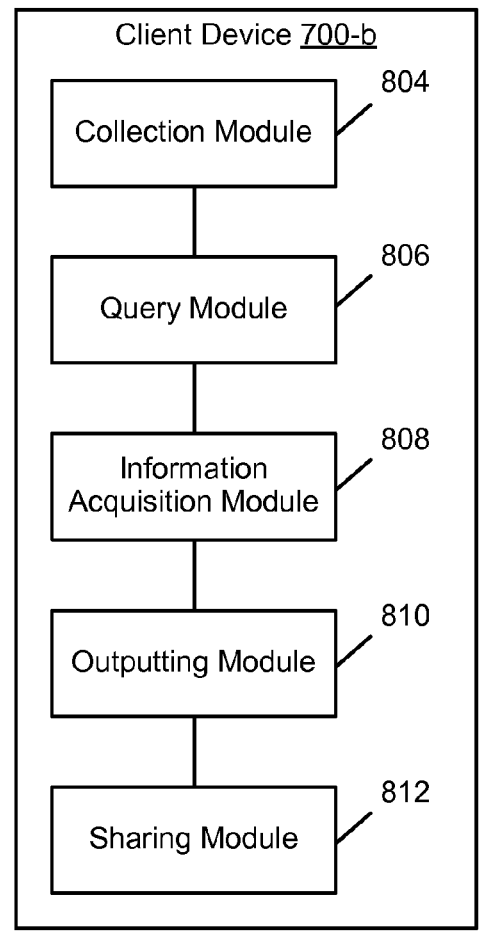
Figure 8C:
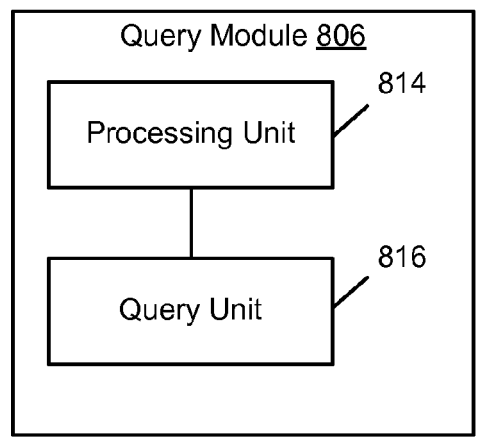
FIG. 8C is a structural schematic diagram of a query module included in FIGS. 8A-8B in accordance with some embodiments.

FIGS. 8A-8C introduce the structure of a client device in accordance with some embodiments. It should be noted that the following client devices can be applied to the aforementioned methods in FIGS. 1-3.

FIG. 8A is a structural schematic diagram of client device 700-a in accordance with some embodiments. Client device 700-a includes: collection module 804; query module 806; information acquisition module 808; and outputting module 810.

Collection module 804 is configured to collect environmental audio data in response to detecting a first trigger event.

Query module 806 is configured to transmit the collected environmental audio data to a server system for the audio information query.

Information acquisition module 808 is configured to obtain attribute information of a media item corresponding to the environmental audio data determined by the server system.

Outputting module 810 is configured to take the attribute information of the media item corresponding to the environmental audio data as the query result to output.

When the client device of the embodiment of the present application detects the first trigger event for the audio information query, the client device automatically collects environmental audio data, and transmits this environmental audio data to a server system to perform the audio information query for attribute information of a media item corresponding to the collected environmental audio data. The audio information query operation is simple and fast, and it is not necessary for the user to manually input the basic information of the audio to be queried, which improves the efficiency of the audio information query and improves the accuracy and intelligence of the audio information query as well.

FIG. 8B is a structural diagram of client device 700-b in accordance with some embodiments. Client device 700-b includes: collection module 804; query module 806; information acquisition module 808; outputting module 810; and sharing module 812. For sake of brevity, refer to the embodiment shown in FIG. 8A for explanation of collection module 804, query module 806, information acquisition module 808, and outputting module 810.

Sharing module 812 is configured to share at least a portion of the attribute information of the media item via a target application when client device 700-*b* detects a sharing operation.

When the client device of the embodiment of the present application detects the first trigger event of the audio information query, the client device automatically collects environmental audio data, and transmits this environmental audio data to a server system to perform the audio information query for attribute information of a media item corresponding to the collected environmental audio data. The audio information query operation is simple and fast, and it is not necessary for the user to manually input the basic information of the audio to be queried, which improves the efficiency of audio information query and improves the accuracy and intelligence of the audio information query as well. Also, in this embodiment, sharing of the searched attribute information corresponding to the media item advances the convenience of social activities.

FIG. 8C is a structural schematic diagram of a query module included in FIGS. 8A-8B in accordance with some embodiments. Query module 806 includes: processing unit 814; and query unit 816.

Processing unit 814 is configured to perform compression processing on the collected environmental audio data to generate a compressed data packet. Processing unit 814 is also configured to extract fingerprint information from the collected environmental audio data, and perform compression processing on the extracted fingerprint information of the environmental audio data to generate a compressed fingerprint packet.

Query unit 816 is configured to transmit the compressed data packet or the compressed fingerprint packet to the server system for the audio information query.

When the client device of the embodiment of the present application detects the first trigger event of the audio information query, the client device automatically collects environmental audio data, and transmits this environmental audio data to a server system to perform the audio information query for attribute information of a media corresponding to the collected environmental audio data. The audio information query operation is simple and fast, and it is not necessary for the user to manually input the basic information of the audio to be queried, which improves the efficiency of the audio information query and improves the accuracy and intelligence of the audio information query as well. Also, in this embodiment, sharing of the searched attribute information corresponding to the media item advances the convenience of social activities.

Figure 9A:
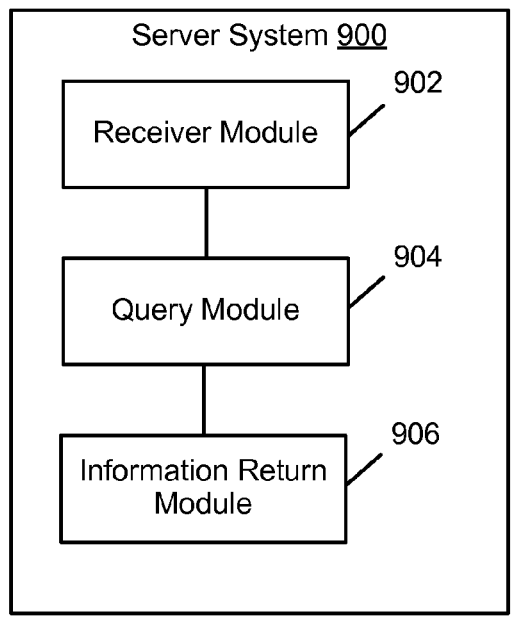
FIG. 9A is a structural schematic diagram of a server system in accordance with some embodiments.
Figure 9B:
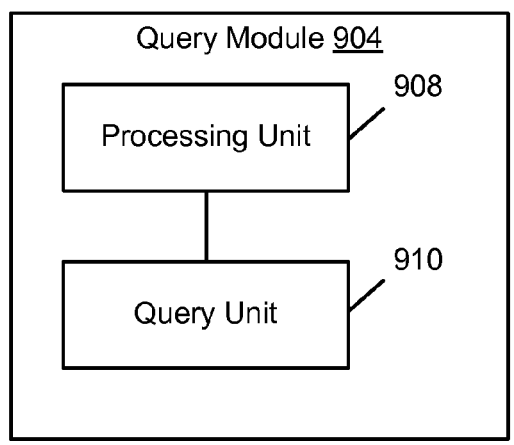
FIG. 9B is a structural schematic diagram of a query module included in FIG. 9A in accordance with some embodiments.

FIGS. 9A-9B introduce the structure of a server system in accordance with some embodiments. It should be noted that the following server system can be applied to the aforementioned methods in FIGS. 4-6.

FIG. 9A is a structural schematic diagram of a server system 900 in accordance with some embodiments. Server system 900 includes: receiver module 902; query module 904; and information return module 906.

Receiver module 902 is configured to receive environmental audio data transmitted by a client device. In some embodiments, receiver module 902 is configured to receive a compressed data packet transmitted by a client device. In some embodiments, receiver module 902 is configured to receive a compressed fingerprint packet transmitted by a client device.

Query module 904 is configured to obtain attribute for a media item by matching the received environmental audio data to the media item in an initialized database.

Information return module 203 is configured to return attribute information of the media item to the client device.

When the client device of the embodiment of the present application detects the first trigger event of the audio information query, the client device automatically collects environmental audio data, and transmits this environmental audio data to a server system to perform the audio information query for attribute information of a media item corresponding to the collected environmental audio data. The audio information query operation is simple and fast, and it is not necessary for the user to manually input the basic information of the audio to be queried, which improves the efficiency of audio information query and improves the accuracy and intelligence of the audio information query as well.

FIG. 9B is a structural schematic diagram of a query module included in FIG. 9A in accordance with some embodiments. Query module 904 includes: processing unit 908; and query unit 910.

Processing unit 908 is configured to perform a decompression process on the received compressed data packet to obtain the environmental audio data and extract fingerprint information from the obtained environmental audio data. Processing unit 908 is configured to perform a decompression process on the received compressed fingerprint packet to obtain fingerprint information of the environmental audio data.

Query unit 910 is configured to determine whether fingerprint information of a media item in an initialized database matches fingerprint information of the environmental audio data. Query unit 910 is also configured to obtain attribute information of the media item in accordance with a determination that fingerprint information of the media item in the initialized database matches the fingerprint information of the environmental audio data.

When the client device of the embodiment of the present application detects the first trigger event for the audio information query, the client device automatically collects environmental audio data, and transmits this environmental audio data to a server system to perform the audio information query for attribute information of a media item corresponding to the collected environmental audio data. The audio information query operation is simple and fast, and it is not necessary for the user to manually input the basic information of the audio to be queried, which improves the efficiency of audio information query and improves the accuracy and intelligence of the audio information query as well.

Figure 10:
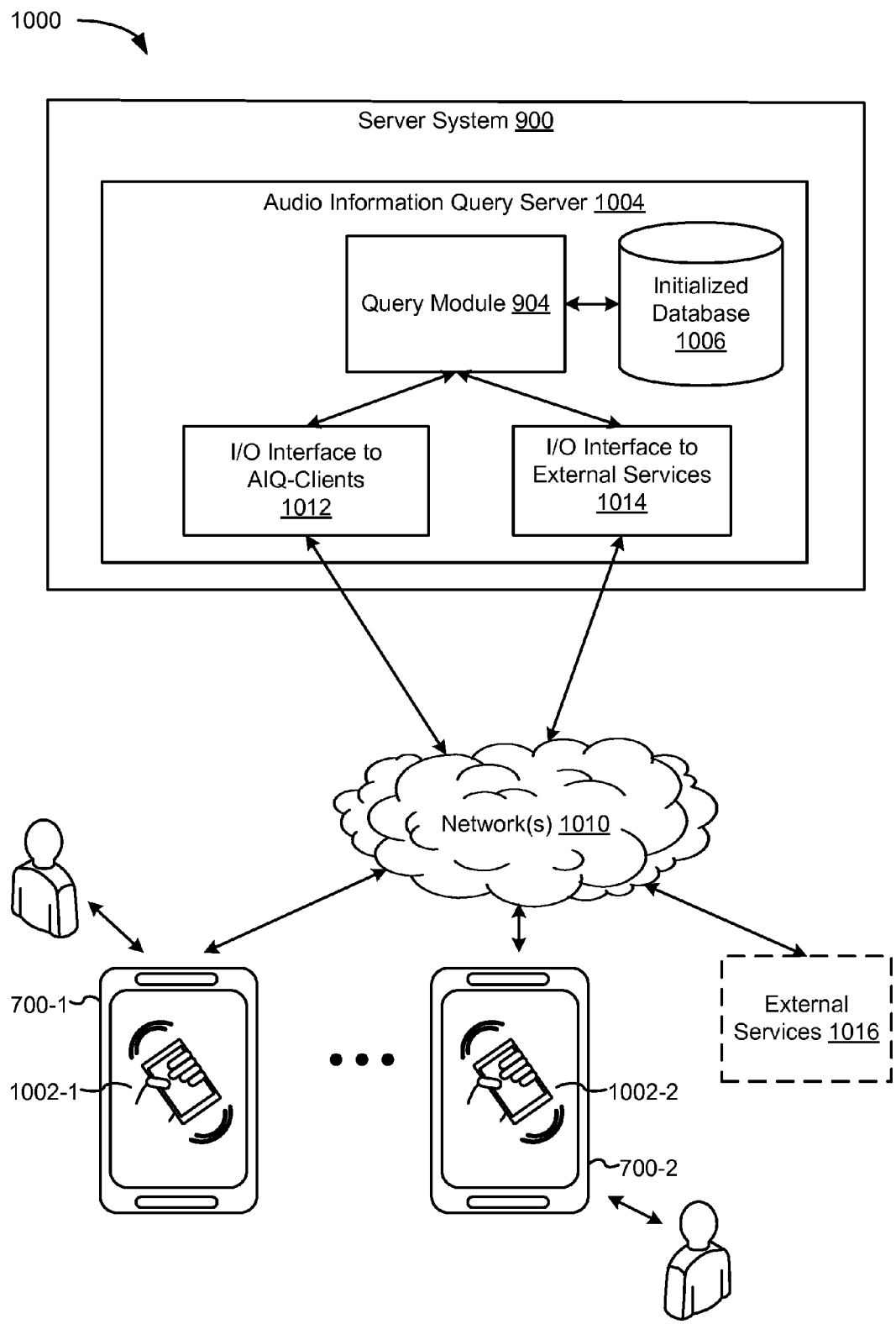
FIG. 10 is a block diagram of a client-server environment in accordance with some embodiments.

As shown in FIG. 10, in some embodiments, audio information query is implemented in a client-server environment 1000. The audio information query includes a client-side portion 1002-1, 1002-2 (hereinafter "AIQ-client 1002") executed on a client device 700-1, 700-2 and a server-side portion 1004 (hereinafter "AIQ-server 1004") executed on a server system 900. AIQ-client 1002 communicates with AIQ-server 1004 through one or more networks 1010. AIQ-client 1002 provides client-side functionalities such as client-facing input and output processing and communications with AIQ-server 1004. AIQ-server 1004 provides server-side functionalities for any number of AIQ-clients 1002 each residing on a respective client device 700.

In some embodiments, AIQ-server 1004 includes an I/O interface to AIQ-clients 1012, query module 904, initialized database 1006, and an I/O interface to external services 1014. I/O interface to AIQ-clients 1012 facilitates the client-facing input and output processing for AIQ-server 1004. Query module 904 matches environmental audio data received from AIQ-client 1002 to a media item stored in initialized database 1006 and retrieves attribute information stored in initialized database 1006 corresponding to the matching media item. In some embodiments, AIQ-server 1004 communicates with external services 1016 through one or more networks 1010 for information acquisition and other services. I/O interface to external services 1014 facilitates such communications.

Examples of client device 700 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 1010 include local area networks ("LAN") and wide area networks ("WAN") such as the Internet. Communication network(s) 1010 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 900 is implemented on one or more standalone data processing apparatuses or a distributed network of computers. In some embodiments, server system 900 also employs various virtual devices and/or services of third party service providers (e.g., third-party cloud service providers) to provide the underlying computing resources and/or infrastructure resources of server system 900.

Although client-server environment 1000 shown in FIG. 10 includes both a client-side portion (e.g., AIQ-client 1002) and a server-side portion (e.g., AIQ-server 1004), in some embodiments, audio information query is implemented as a standalone application installed on user device 700. In addition, the division of functionalities between the client and server portions of audio information query can vary in different embodiments. For example, in some embodiments, AIQ-client 1002 is a thin-client that provides only user-facing input and output processing functions, and delegates all other audio information query functionalities to a backend server (e.g., server system 900).

Figure 11:
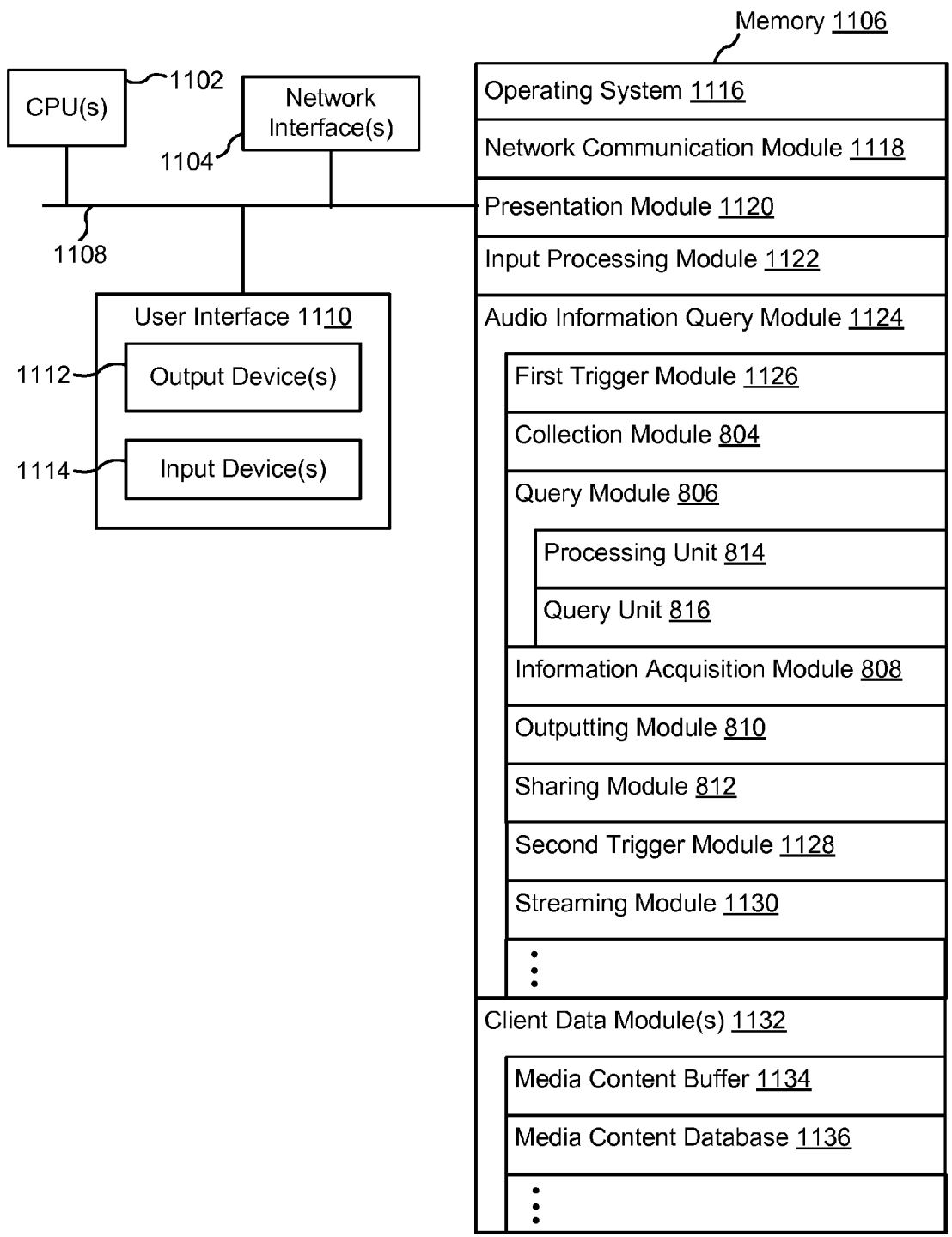
FIG. 11 is a block diagram of a client device in accordance with some embodiments.

FIG. 11 is a block diagram illustrating a representative client device 700 associated with a user in accordance with some embodiments. Client device 700, typically, includes one or more processing units (CPUs) 1102, one or more network interfaces 1104, memory 1106, and one or more communication buses 1108 for interconnecting these components (sometimes called a chipset). Client device 700 also includes a user interface 1110. User interface 1110 includes one or more output devices 1112 that enable presentation of media content, including one or more speakers (e.g., speaker 702, FIGS. 7A-7F) and/or one or more visual displays (e.g., touch screen display 706, FIGS. 7A-7F). User interface 1110 also includes one or more input devices 1114, including user interface components that facilitate user input such as a keyboard, a mouse, a voice-command input unit or microphone (e.g., microphone 704, FIGS. 7A-7F), a touch screen display (e.g., touch screen display 706, FIGS. 7A-7F), a touch-sensitive input pad, a gesture capturing camera, or other input buttons or controls. Furthermore, some client devices 700 use a microphone and voice recognition or a camera and gesture recognition to supplement or replace the keyboard. Memory 1106 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 1106, optionally, includes one or more storage devices remotely located from CPU(s) 1102. Memory 1106, or alternately the non-volatile memory device(s) within memory 1106, includes a non-transitory computer readable storage medium. In some implementations, memory 1106, or the non-transitory computer readable storage medium of memory 1106, stores the following programs, modules, and data structures, or a subset or superset thereof:

- an operating system 1116 including procedures for handling various basic system services and for performing hardware dependent tasks;
- a network communication module 1118 for connecting user device 700 to other computers (e.g., server system 900) connected to one or more networks 1010 via one or more communication network interfaces 1104 (wired or wireless);
- a presentation module 1120 for enabling presentation of information (e.g., a user interface for a web page or an application program, audio and/or video content, text, etc.) at client device 700 via one or more output devices 1112 (e.g., displays, speakers, etc.) associated with user interface 1110;
- an input processing module 1122 for detecting one or more user inputs or interactions from one of the one or more input devices 1114 and interpreting the detected input or interaction; and
- an audio information query module 1124 for enabling client device 700 to perform an audio information query (e.g., audio information query module 1124 is a function within an application or application environment), including but not limited to:
  - a first trigger event module 1126 for detecting/monitoring for a first trigger event;
  - a collection module 804 for collecting environmental audio data with one or more input devices 1114 (e.g., a microphone) in response to detecting a first trigger event;
  - a query module 806 for processing and transmitting the collected environmental audio data to server system 900 for the audio information query, including:
    - a processing unit 814 for performing compression and/or extracting fingerprint information extraction processing on the collected environmental audio data; and
    - a query unit 816 for transmitting the compressed data packet or the compressed fingerprint packet to server system 900 for the audio information query;
  - an information acquisition module 808 for obtaining attribute information of a media item corresponding to the environmental audio data determined by server system 900;
  - an outputting module 810 for taking the attribute information of the media item corresponding to the environmental audio data as the query result to output;
  - a sharing module 812 for sharing at least a portion of the attribute information of the media item via a target application in response to detecting a sharing operation;

a second trigger module 1128 for detecting/monitoring for a second trigger event different from the first trigger event; and a streaming module 1130 for streaming (or resolving a URL link to) audio corresponding to the environmental audio data in response to detecting the second trigger event;

one or more client data modules 1132 for storing data related to client device 700, including but not limited to:

a media content buffer 1134 for temporarily storing content received from server system 900 or other computing devices (e.g., attribute information or streaming audio); and a media content database 1136 for storing received content as part of the user's personal library of media content.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1106, optionally, stores a subset of the modules and data structures identified above. Furthermore, memory 1106, optionally, stores additional modules and data structures not described above.

Figure 12:
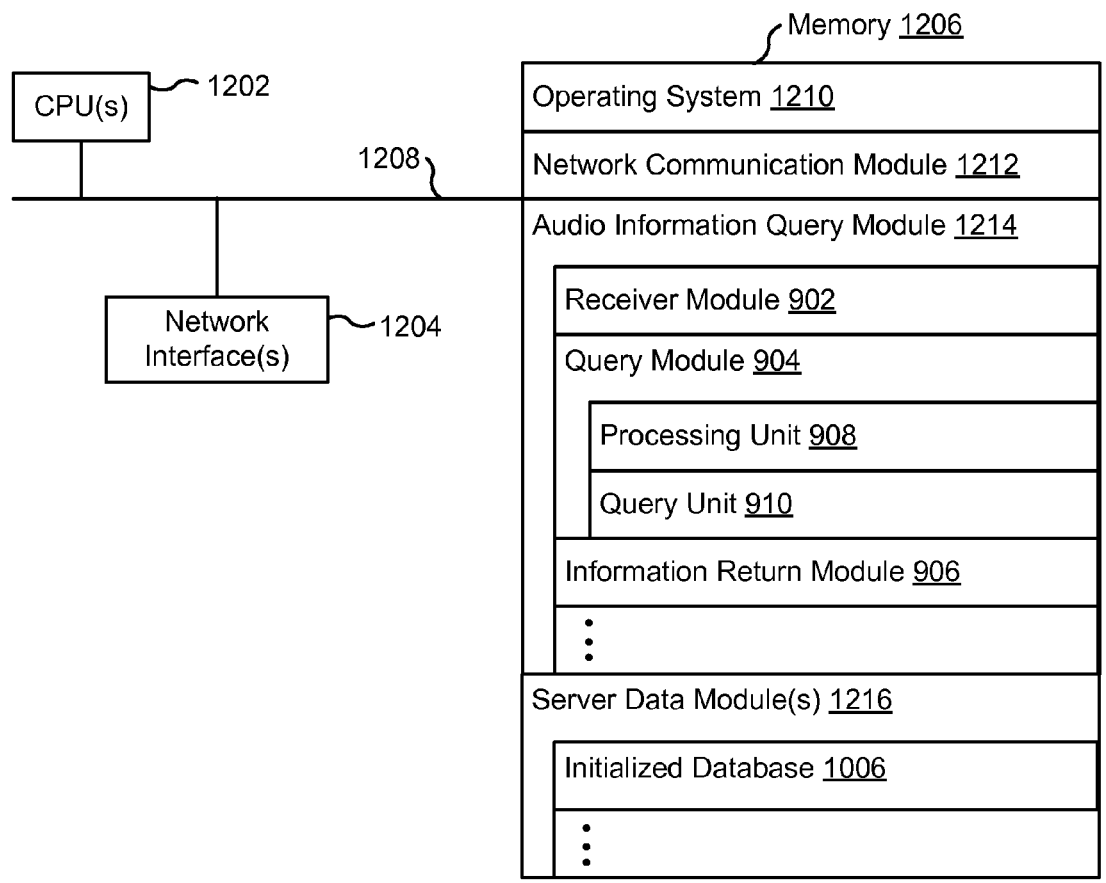
FIG. 12 is a block diagram of a client device in accordance with some embodiments.

FIG. 12 is a block diagram illustrating server system 900 in accordance with some embodiments. Server system 900, typically, includes one or more processing units (CPUs) 1202, one or more network interfaces 1204, memory 1206, and one or more communication buses 1208 for interconnecting these components (sometimes called a chipset). Memory 1206 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 1206, optionally, includes one or more storage devices remotely located from the CPU(s) 1202. Memory 1206, or alternately the non-volatile memory device(s) within memory 1206, includes a non-transitory computer readable storage medium. In some implementations, memory 1206, or the non-transitory computer readable storage medium of memory 1206, stores the following programs, modules, and data structures, or a subset or superset hereof:

an operating system 1210 including procedures for handling various basic system services and for performing hardware dependent tasks;

a network communication module 1212 that is used for connecting server system 900 to other computing devices (e.g., client devices 700) connected to one or more networks 1010 via one or more network interfaces 1204 (wired or wireless);

an audio information query module 1214 for enabling server system 900 to perform an audio information query requested by a client device 700, including but not limited to:

a receiver module 902 for receiving environmental audio data transmitted by a client device for the audio information query;

a query module 904 for obtaining attribute for a media item by matching the received environmental audio data to the media item in initialized database 1006, including:

a processing unit 908 for performing decompressing the received environmental audio data and/or extracting fingerprint information from the received environmental audio data; and a query unit 910 for determining whether fingerprint information of a media item in initialized database 1006 matches fingerprint information of the environmental audio data, and obtaining attribute information of the media item in accordance with a determination that fingerprint information of the media item in initialized database 1006 matches the fingerprint information of the environmental audio data; and an information return module 906 for returning attribute information of the media item to the requesting client device 700; and one or more server data modules 1216 for storing data related to server system 900, including but not limited to:

an initialized database 1006 including a plurality of media items with marks, fingerprint information, and attribute information corresponding to the plurality of media items.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1206, optionally, stores a subset of the modules and data structures identified above. Furthermore, memory 1206, optionally, stores additional modules and data structures not described above.

Although FIG. 12 shows server system 900, FIG. 12 is intended more as functional description of the various features which may be present in a set of servers than as a structural schematic of the implementations described herein. In practice, and as recognized by those of ordinary skill in the art, items shown separately could be combined and some items could be separated. For example, some items shown separately in FIG. 12 could be implemented on a single server and single items could be implemented by one or more servers. The actual number of servers used to implement server system 900 and how features are allocated among them will vary from one implementation to another.

Figure 13:
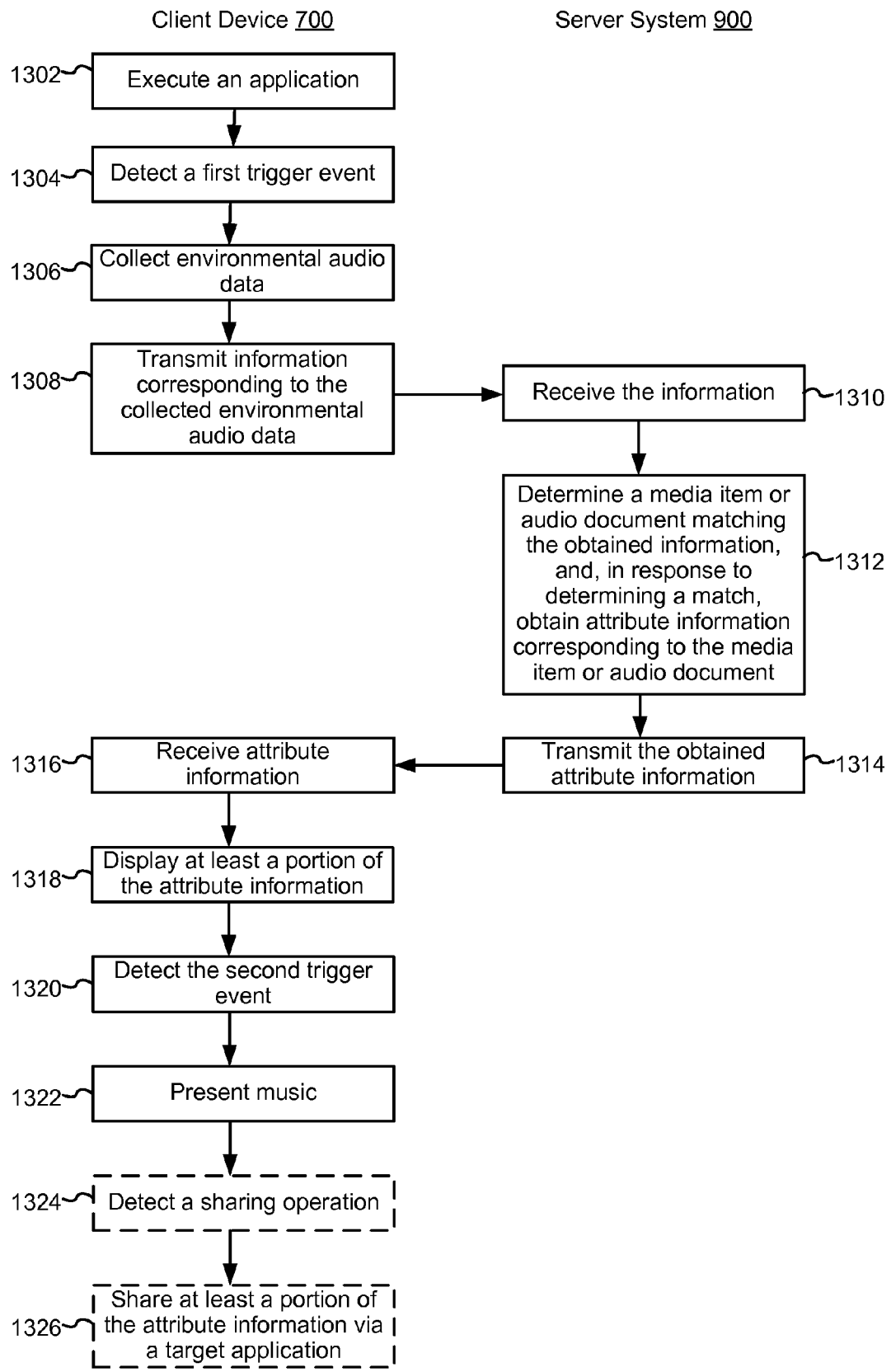
FIG. 13 is a flowchart diagram of a method of performing an information query method in the client-server environment in accordance with some embodiments.

FIG. 13 is a flowchart diagram of a method of performing an audio information query in a client-server environment in accordance with some embodiments. The client-server environment includes client device 700, which includes one or more processors and memory and optionally includes a microphone, speaker and display, and server system 900, which includes one or more processors and memory. Embodiments described above with reference to FIGS. 1-7 provide a basis for the embodiments described below with reference to FIG. 13.

As one example, a user hears a song played over the speakers at a local coffee house and wishes to know the artist and title of the song. In this example, while an application or application environment with a media detection feature is being executed on a mobile phone of the user, the user shakes the mobile phone to trigger the media detection feature. In response to the shaking action, the mobile phone records an audio sample of background audio including the song played over the speakers and sends information related to the audio sample to a server. In turn, the server performs an audio information query to match the audio sample to a media item. If a match is found the server returns attribute information for the media item (e.g., the artist's name and title of the song). Subsequently, if the user leaves the coffee house or selects a playback affordance, the mobile phone plays the song synchronized with the background audio. The user is further enabled to share the song with a contact via the executed application or another selected target application (e.g., a social networking service).

Client device 700 executes (1302) an application or application environment. For example, the user selects an application on the client device and enables a media detection feature of the application (if not already enabled). FIG. 7A, for example, shows a user enabling a media detection function while in an application or application environment.

Client device 700 detects (1304) a first trigger event. In some embodiments, the trigger event is detected while the application is executed in either the foreground (e.g., the application is currently displayed) or the background (e.g., the application is not currently displayed but is monitoring for the first trigger event). In some embodiments, the first trigger event occurs when a specific affordance is selected in the application or application environment (e.g., play affordance 726, FIG. 7E), a predetermined voice command is received while in the application or application environment (e.g., "find song" or "perform audio information query"), a predetermined gesture is detected on touch screen 706 while in the application or application environment (e.g., double tap with two or more fingers), or a gravity induction event or change in velocity or acceleration over a predetermined threshold is detected with an accelerometer of client device 700 while in the application or application environment (e.g., the user shakes client device 700).

In response to detecting the first trigger event, client device 700 collects (1306) a sample of environmental audio data. For example, client device 700 collects environmental data with microphone 704. In some embodiments, upon occurrence of the first trigger, client device 700 collects only one audio sample of the environmental audio data, periodically collects audio samples of the environmental audio data according to a predefined time interval (e.g., every 1, 5, 10, etc. seconds), or continuously collects audio samples of the environmental audio data.

Client device 700 transmits (1308) information corresponding to the collected environmental audio data to server system 900. In some embodiments, client device 700 processes the collected sample of the environmental audio data by performing a compression process as explained above with reference to FIG. 2 and/or fingerprint information extraction process as explained above with reference to FIG. 3 on the collected audio sample prior to transmission to server system 900. In turn, client device 700 transmits a compressed audio sample, fingerprint information, or compressed fingerprint information to server system 900.

Server system 900 receives (1310) the information from client device 700. In some embodiments, when server system 900 receives a compressed audio sample, server system 900 performs a decompression and fingerprint extraction process on the compressed audio sample as explained above with reference to FIG. 5. In some embodiments, when server system 900 receives a compressed fingerprint information, server system 900 performs a decompression extraction process on the compressed fingerprint information as explained above with reference to FIG. 6.

Server system 900 determines (1312) a media item matching the received information, and, in response to determining the match, server system 900 obtains attribute information corresponding to the media item. In some embodiments, server system 900, or a remote database communicatively coupled with server system 900, stores a collection (e.g., initialized database 1006) of media items or representation of the media items (e.g., audio fingerprints) and attribute information corresponding to each of the media items. In some embodiments, the media item is a song, television program, radio program, movie, or the like. In some embodiments, attribute information is metadata corresponding to the media item including the artist or composer name, title, album name, recording or release date, album cover or other preview image, lyrics, and/or other descriptive information. In some embodiments, the attribute information further includes a URL link or stream information for playback and a time indicator or timestamp of the audio sample for synchronized playback and lyrics.

Server system 900 transmits (1314) the attribute information corresponding to the media item to client device 700. In some embodiments, when server system 900 fails to determine a media item matching the received information, server system 900 transmits an error message or a notification to client device 700 prompting the user to "try again."

Client device 700 receives (1316) attribute information corresponding to the media item from server system 900.

Client device 700 displays (1318) at least a portion of the attribute information corresponding to the media item. FIGS. 7C-7E, for example, show client device 700 displaying an audio information query result interface with attribute information for a media item. In FIGS. 7C-7E, the attribute information includes the artist name, song title, album name, and release date displayed in banner 720. In FIGS. 7C-7E, the attribute information also includes album cover image 722 and lyrics 724.

Client device 700 detects (1320) a second trigger event. In some embodiments, the second trigger event occurs when the user selects a play affordance within the executed application or application environment, a collected audio sample no longer matches the media item (e.g., the user has left the location where the environmental audio data was initially collected), or a GPS or network signal indicates that the client device is no longer at the location where the environmental audio was initially collected. For example, client device 700 detects a contact at a location corresponding to play affordance 726 in FIG. 7E. In this example, selection of play affordance 726 is the second trigger event.

Client device 700 presents (1322) the media item based on a time indicator. For example, in response to detecting selection of play affordance 726 in FIG. 7E, client device 700 resolves or executes a URL link or stream information in the attribute information received form server system 900 so as to cause playback of the media item via one or more speakers 702 from the most recent time indicator or timestamp so as to synchronize playback with the environmental audio data.

In some embodiments, client device 700 detects (1324) a sharing operation. FIG. 7E, for example, shows client device 700 detecting selection of share affordance 730. In response to detecting selection of share affordance 730 in FIG. 7E, FIG. 7F, for example, shows client device 700 displaying a sharing interface with application icons 738 for selecting a target application with which to share a portion of the attribute information and contact icons 742 for selecting a contact with whom to share the portion of the attribute information.

In some embodiments, in response to detecting the sharing operation, client device 700 shares (1326) at least a portion of the attribute information via a target application. FIG. 7F, for example, shows client device 700 detecting selection of send affordance 750. In response to detecting selection of send affordance 750, client device 700 shares the attribute information displayed in attribute information box 746 (and, optionally, a URL or stream information for playing the media item) along with the message in message box 744 with one or more contacts 742 selected in contacts box 740 via the target application 738 selected in target application selection box 736.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method of performing an audio information query, comprising:
    at an electronic device with one or more processors, memory, and a display:
    detecting a first trigger event;
    in response to detecting the first trigger event, collecting an audio sample of environmental audio data with a microphone of the electronic device, wherein the environmental audio data is associated with a media item;
    transmitting information corresponding to the audio sample to a server;
    in response to transmitting the information corresponding to the audio sample to the server, obtaining attribute information corresponding to the audio sample, wherein the attribute information includes metadata corresponding to the media item, a time indicator corresponding to a position of the audio sample relative to the media item, and stream information associated with the media item;
    displaying at least a portion of the attribute information on the display;
    detecting a second trigger event; and
    in response to detecting the second trigger event:
    determining a last obtained time indicator for the media item;
    streaming the media item based on the stream information in the received attribute information; and
    presenting the media item from the last obtained time indicator.

2. The method of claim 1, wherein the first trigger event is detected when an accelerometer of the electronic device detects a change in gravity in excess of a predefined threshold.

3. The method of claim 1, wherein the media item is a song, and wherein at least a portion of the metadata associated with the media item includes lyrics corresponding to the song; and
    the method, including:
        after obtaining the attribute information, automatically displaying on the display a first portion of the lyrics for the song corresponding to the time indicator in a primary display position in a first region, wherein the portion of the lyrics corresponds to the time indicator.

4. The method of claim 3, including:
    ceasing to display the first portion of the lyrics in the primary display position;
    fading out the first portion of the lyrics;
    displaying a second portion of the lyrics in the primary display position, wherein the second portion of the lyrics is different from and subsequent to the first portion; and
    fading in a third portion of the lyrics, wherein the third portion of the lyrics is different from the first and second portions and subsequent to the second portion.

5. The method of claim 4, including, displaying a focus indicator, wherein the focus indicator is configured to draw a user's attention to a current word of the song.

6. The method of claim 3, wherein the metadata associated with the media item includes descriptive information corresponding to the song; and
    the method, including:
        while displaying the first portion of the lyrics the primary display position in the first region, concurrently displaying on the display the descriptive information in a second region distinct from the first region.

7. The method of claim 6, wherein the descriptive information corresponding to the song includes one or more of a title, an artist name, a release date, an album name, and an album cover image.

8. An electronic device comprising:
one or more processors;
a display; and
memory storing one or more programs to be executed by the one or more processors,
the one or more programs comprising instructions for:
detecting a first trigger event;
in response to detecting the first trigger event, collecting an audio sample of environmental audio data with a microphone of the electronic device, wherein the environmental audio data is associated with a media item;
transmitting information corresponding to the audio sample to a server;
in response to transmitting the information corresponding to the audio sample to the server, obtaining attribute information corresponding to the audio sample, wherein the attribute information includes metadata corresponding to the media item, a time indicator corresponding to a position of the audio sample relative to the media item, and stream information associated with the media item;
displaying at least a portion of the attribute information on the display;
detecting a second trigger event; and
in response to detecting the second trigger event:
determining a last obtained time indicator for the media item;
streaming the media item based on the stream information in the received attribute information; and
presenting the media item from the last obtained time indicator.

9. The electronic device of claim 8, wherein the first trigger event is detected when an accelerometer of the electronic device detects a change in gravity in excess of a predefined threshold.

10. The electronic device of claim 8, wherein:
the media item is a song, and wherein at least a portion of the metadata associated with the media item includes lyrics corresponding to the song; and
the one or more programs further comprise instructions for:
after obtaining the attribute information, automatically displaying on the display a first portion of the lyrics for the song corresponding to the time indicator in a primary display position in a first region, wherein the portion of the lyrics corresponds to the time indicator.

11. The electronic device of claim 10, wherein the one or more programs further comprise instructions for:
ceasing to display the first portion of the lyrics in the primary display position;
fading out the first portion of the lyrics;
displaying a second portion of the lyrics in the primary display position, wherein the second portion of the lyrics is different from and subsequent to the first portion; and
fading in a third portion of the lyrics, wherein the third portion of the lyrics is different from the first and second portions and subsequent to the second portion.

12. The electronic device of claim 11, wherein the one or more programs further comprise instructions for displaying a focus indicator, wherein the focus indicator is configured to draw a user's attention to a current word of the song.

13. The electronic device of claim 10, wherein:
the metadata associated with the media item includes descriptive information corresponding to the song; and
the one or more programs further comprise instructions for:
while displaying the first portion of the lyrics the primary display position in the first region, concurrently displaying on the display the descriptive information in a second region distinct from the first region.

14. A non-transitory computer readable storage medium storing one or more programs, the one or more programs comprising instructions, which, when executed by an electronic device with one or more processors and a display, cause the device to perform operations comprising:
detecting a first trigger event;
in response to detecting the first trigger event, collecting an audio sample of environmental audio data with a microphone of the electronic device, wherein the environmental audio data is associated with a media item;
transmitting information corresponding to the audio sample to a server;
in response to transmitting the information corresponding to the audio sample to the server, obtaining attribute information corresponding to the audio sample, wherein the attribute information includes metadata corresponding to the media item, a time indicator corresponding to a position of the audio sample relative to the media item, and stream information associated with the media item;
displaying at least a portion of the attribute information on the display;
detecting a second trigger event; and
in response to detecting the second trigger event:
determining a last obtained time indicator for the media item;
streaming the media item based on the stream information in the received attribute information; and
presenting the media item from the last obtained time indicator.

15. The non-transitory computer readable storage medium of claim 14, wherein the first trigger event is detected when an accelerometer of the electronic device detects a change in gravity in excess of a predefined threshold.

16. The non-transitory computer readable storage medium of claim 14, wherein:
the media item is a song, and wherein at least a portion of the metadata associated with the media item includes lyrics corresponding to the song; and
the one or more programs further comprise instructions which cause the device to perform operations comprising:
after obtaining the attribute information, automatically displaying on the display a first portion of the lyrics for the song corresponding to the time indicator in a primary display position in a first region, wherein the portion of the lyrics corresponds to the time indicator.

17. The non-transitory computer readable storage medium of claim 16, wherein the one or more programs further comprise instructions which cause the device to perform operations comprising:
ceasing to display the first portion of the lyrics in the primary display position;
fading out the first portion of the lyrics;
displaying a second portion of the lyrics in the primary display position, wherein the second portion of the lyrics is different from and subsequent to the first portion; and
fading in a third portion of the lyrics, wherein the third portion of the lyrics is different from the first and second portions and subsequent to the second portion.

18. The non-transitory computer readable storage medium of claim 17, wherein the one or more programs further comprise instructions which cause the device to perform operations comprising displaying a focus indicator, wherein the focus indicator is configured to draw a user's attention to a current word of the song.

19. The non-transitory computer readable storage medium of claim 14, wherein:
- the metadata associated with the media item includes descriptive information corresponding to the song; and
- the one or more programs further comprise instructions which cause the device to perform operations comprising:
  - while displaying the first portion of the lyrics the primary display position in the first region, concurrently displaying on the display the descriptive information in a second region distinct from the first region.

* * * * *